US008531701B2

(12) United States Patent
Endo

(10) Patent No.: US 8,531,701 B2
(45) Date of Patent: Sep. 10, 2013

(54) CONTROLLING POST-PROCESSING OPERATIONS IN AN IMAGE FORMING APPARATUS BASED ON RECEPTON OF AN IMAGE FORMING INSTRUCTION

(75) Inventor: Takahiro Endo, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 953 days.

(21) Appl. No.: 12/399,001

(22) Filed: Mar. 5, 2009

(65) Prior Publication Data

US 2009/0225363 A1 Sep. 10, 2009

(30) Foreign Application Priority Data

Mar. 10, 2008 (JP) ................................ 2008-059405
Feb. 24, 2009 (JP) ................................ 2009-041047

(51) Int. Cl.
*G06F 3/12* (2006.01)

(52) U.S. Cl.
USPC ............. 358/1.15; 358/1.13; 399/75; 399/82

(58) Field of Classification Search
USPC ........................... 358/1.15, 1.13; 399/82, 75
See application file for complete search history.

(56) References Cited

U.S. PATENT DOCUMENTS 6,775,729 B1 8/2004 Matsuo et al.
2002/0061203 A1* 5/2002 Akaike et al. .................. 399/75
2006/0126092 A1* 6/2006 Okanishi et al. ............ 358/1.13
2006/0177230 A1* 8/2006 Ishii .............................. 399/12
2007/0104498 A1* 5/2007 Tachibana et al. ............. 399/19

FOREIGN PATENT DOCUMENTS

JP 61-91675 5/1986
JP 2006-285294 10/2006
JP 2009-151104 7/2009

* cited by examiner

*Primary Examiner* — Qian Yang
(74) *Attorney, Agent, or Firm* — Fitzpatrick, Cella, Harper & Scinto

(57) ABSTRACT

Provided is an image forming apparatus including: a print unit; an instruction unit for giving an instruction to start a printing operation; and a print control unit for controlling the printing operation according to the instruction to start the printing operation from the instruction unit, in which, when there is no instruction to start a subsequent printing operation after the executing of the printing operation to the recording medium according to the instruction to start the printing operation from the instruction unit, the print control unit executes a first post-processing operation for completing the printing operation, and the print control unit determines an operation to be performed after the executing of the first post-processing operation based on whether or not the instruction to start the subsequent printing operation is received during the executing of the first post-processing operation.

15 Claims, 16 Drawing Sheets

CONTROLLING POST-PROCESSING OPERATIONS IN AN IMAGE FORMING APPARATUS BASED ON RECEPTON OF AN IMAGE FORMING INSTRUCTION

BACKGROUND OF THE INVENTION

1. Field of the Invention

The present invention relates to an image forming apparatus, and more particularly, to operation of an apparatus of an electrophotographic system that develops an electrostatic latent image formed on an image bearing member with a developer, and transfers and fixes a developed toner image onto a recording medium to perform image formation.

2. Description of the Related Art

An image forming apparatus such as a laser printer includes a video controller (controller part) that receives print information from a host computer, performs analysis of the information and image processing, and generates video data for printing. Further, there is provided an engine (engine control part) communicatably connected to the video controller to perform image forming operation according to the video data from the video controller. Among apparatuses of this type, there are apparatuses configured to combine the video controller and the engine together, which are different in function from each other.

The video controller and the engine are configured to be communicatable with each other so that the video controller transmits, to the engine, various instructions related to image formation as commands, and the engine returns, to the video controller, an internal state of the engine as a status.

When the print information is transmitted from the host computer to the video controller, the video controller analyzes the print information, and transmits a reservation command of the printing operation to the engine. Upon completion of image processing, the video controller transmits a print starting command for reserved printing operation to the engine. Upon receiving the print starting command from the video controller, the engine shifts the state of the engine from a standby state to a print state enabling printing operation, and starts printing operation. After the printing operation starts, that is, in shifting from the standby state to the print state, various actuators such as a motor which is a drive source for conveying a recording medium start up. Further, various units for charging, exposure, development, transfer, and fixing required for an electrophotographic process start up together. It is necessary that the startup of those units is executed at a predetermined timing and in a predetermined order. The startup is a pre-processing step conducted before printing operation, and the pre-processing is called “pre-rotation”.

When printing operation is executed in the print state, and there is no reservation command to be processed which is issued from the video controller, it is determined that all of the printing operation has been completed, and the various actuators and the various units stop so as to again shift to the standby state. This operation is a post-processing step conducted after the printing operation, and the post-processing step is called “post-rotation”.

A period of time required for the pre-rotation and the post-rotation is different depending on the size of the laser printer, or the operating speed thereof, and ranges from around several seconds to around several tens.

For that reason, there arises the following problem. The engine determines that there is no reservation of print to be processed and the printing operation has been completed at the time of the print state, and then starts post-rotation. When a new print reservation command (reservation of printing operation) and a print starting command (start of printing operation) are transmitted from the video controller to the engine immediately after the post-rotation starts, there arises the following problem.

With the conventional technology, once the engine starts the post-rotation, the engine cannot stop the post-rotation on the way, and executes the post-rotation to the last. Since the engine is in a standby state at the time of completing the post-rotation, the printing operation cannot start unless the engine executes the pre-rotation from that state and enters the print state in order to follow an instruction from the video controller.

That is, the printing operation has to wait while both the post-rotation and the pre-rotation are executed, in which a new print starting command is received from the video controller, the engine enters a printable state, and the printing operation actually starts. The wait time is called “down time”.

On the other hand, a timing at which the engine starts the post-rotation is called “print continuation timing”. When the video controller transmits the print reservation command to the engine before the print continuation timing, the engine does not start the post-rotation.

The above-mentioned problem arises, for example, when the reservation of the printing operation from the video controller is not notified by a timing necessary for continuing the contiguous printing operation, that is, when a subsequent print reservation command is transmitted from the video controller with a delay.

In order to solve occurrence of the down time, there have been proposed a variety of systems. For example, there has been proposed a system in which a command for notifying a delay of the print reservation command is prepared so that the engine is prevented from entering the post-rotation even if the video controller cannot transmit the print reservation command for a subsequent page by the print continuation timing. When the engine receives the command (print reservation delay command) from the video controller, a timing when the engine enters the post-rotation is extended (for example, refer to Japanese Patent Application Laid-Open No. 2006-015515).

However, if the timing when the engine enters the post-rotation is extended, the engine continues the print state. Some units of the engine consume their lifetimes just because they are in the print state. For example, those units include components of a process cartridge (consumable) that is detachably attached to the laser printer. Hereinafter, the process cartridge is described in brief.

The process cartridge has been widespread as a unit detachably attached to the laser printer for the main purpose of recycling a resource. The process cartridge of this type integrally includes a photosensitive drum, a charger, an exposing unit, a developing unit, a cleaner, and a toner container necessary for image formation in the electrophotographic process system. Among the respective components of the process cartridge, for example, the photosensitive drum and a developing roller of the developing unit each have a lifetime. When a rotation time of the photosensitive drum or the developing roller is counted up, and the counted accumulative value reaches a given threshold value, it is determined that the lifetime of the process cartridge is ended, and a user is urged to replace the process cartridge.

If the timing when the engine enters the post-rotation is extended, no down time occurs. However, there arises such a problem that since the components of the process cartridge, such as the photosensitive drum and the developing unit, still operates, those components are fast consumed (an increase in rotation time of the photosensitive drum and the rotation time of the developing roller).

It has been difficult to solve, at the same time, both of the two problems, by which the down time is reduced, and the lifetime of the consumables of the process cartridge is prevented from reducing.

SUMMARY OF THE INVENTION

An object of the present invention is to solve the above-mentioned problems, and to thereby minimize the occurrence of a down time and prevent the lifetime of components in a process cartridge from being unnecessarily consumed.

In order to achieve the above-mentioned object, according to the present invention, an image forming apparatus for forming an image on a recording medium comprises: a print unit for printing the image on the recording medium; an instruction unit for giving an instruction to start a printing operation for the each recording medium; and a print control unit for controlling the printing operation to the recording medium according to the instruction to start the printing operation from the instruction unit, wherein, when there is no instruction to start a subsequent printing operation from the instruction unit after the executing of the printing operation to the recording medium according to the instruction to start the printing operation from the instruction unit, the print control unit executes a first post-processing operation for completing the printing operation, and the print control unit determines one of a second post-processing operation and a return process to be executed after the executing of the first post-processing operation based on whether or not the instruction to start the subsequent printing operation is received during the executing of the first post-processing operation.

Further, according to the present invention, a controlling method of an image forming apparatus for forming an image on a recording medium comprises: a printing step of executing a printing operation to the recording medium according to an instruction to start the printing operation; a first post-processing step of executing a first post-processing operation for completing the printing operation when there is no instruction to start a subsequent printing operation after the printing step; and a process determining step of determining one of a second post-processing operation and a return processing to be executed after the executing of the first post-processing operation based on whether or not the instruction to start the subsequent printing operation is received during the first post-processing step.

Further features of the present invention become apparent from the following description of exemplary embodiments with reference to the attached drawings.

DESCRIPTION OF THE EMBODIMENTS

Hereinafter, a description is made in detail of embodiments of the present invention with reference to the accompanying drawings. The components described in the embodiments are merely exemplified, and the technical scope of the present invention is determined by the claims, and is not limited by the individual embodiments described below.

Hereinafter, embodiments of the present invention are described in more detail.

First Embodiment

A first embodiment of the present invention is described.

(Description of Control System Block Diagram for Color Laser Printer)

Figure 1:
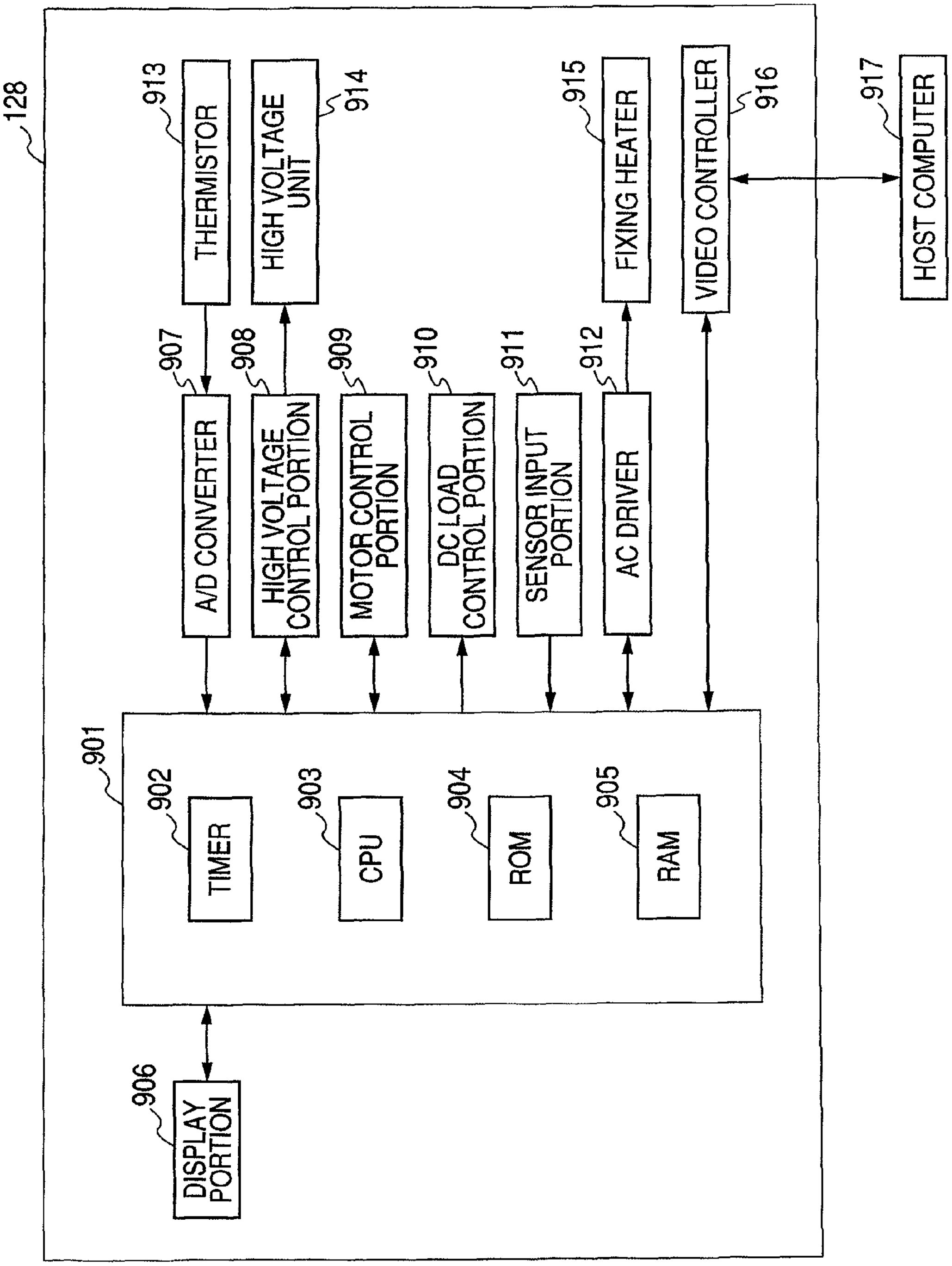
FIG. 1 illustrates a control block diagram of a color laser printer according to first to third embodiments.
Figure 2:
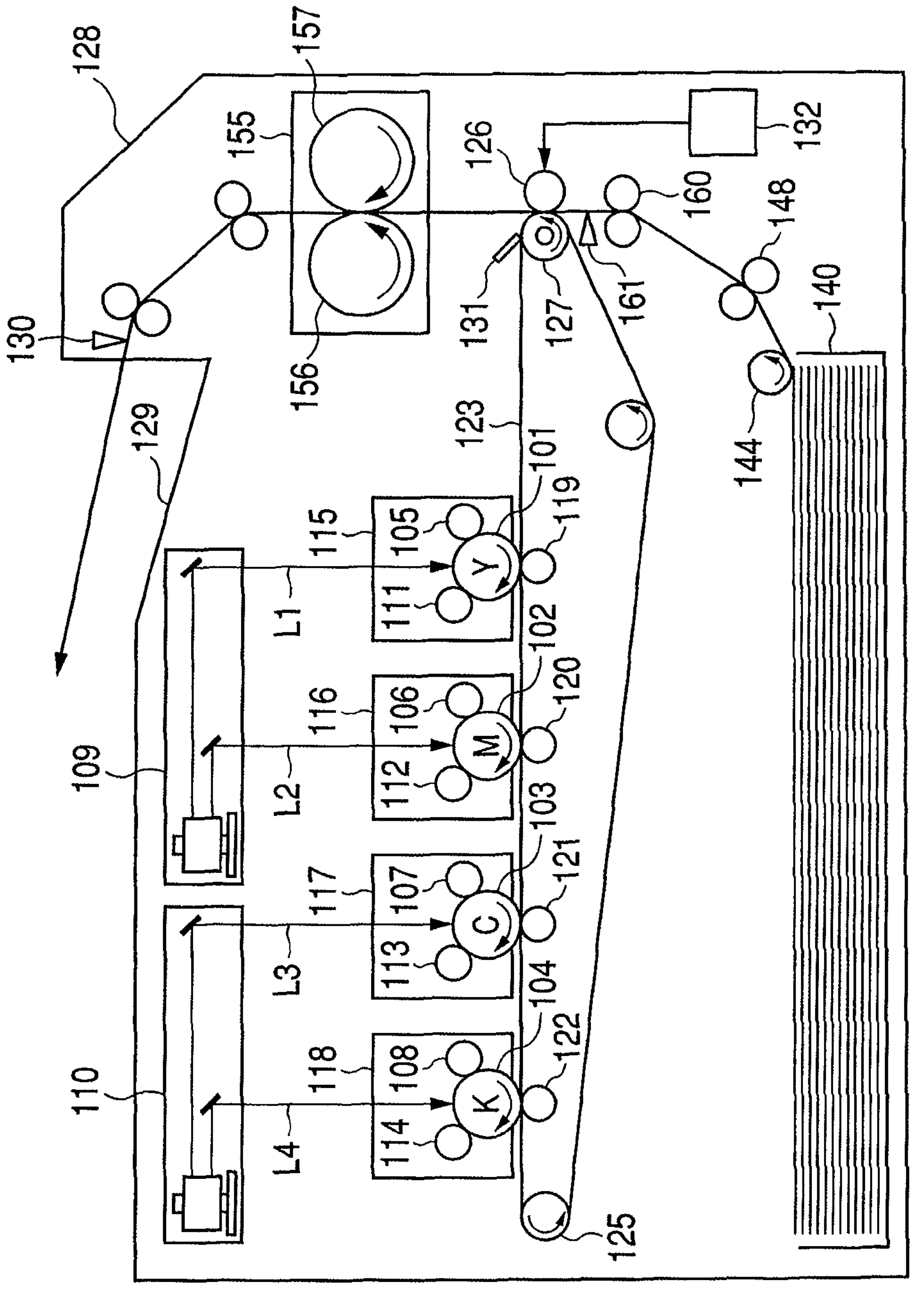
FIG. 2 illustrates a cross-sectional view of the color laser printer according to the first to third embodiments.

A control system block diagram of a color laser printer as an image forming apparatus illustrated in FIG. 2 is illustrated in FIG. 1. A cross section of the color laser printer according to the first embodiment is illustrated in FIG. 2. A control block is described with reference to FIG. 1.

Referring to FIG. 1, a color laser printer 128 as an image forming apparatus receives print information or image information from a host computer 917 by a video controller 916 (controller portion). The video controller 916 analyzes the print information, and transmits information indicating under what print conditions image formation should be conducted, to a system controller 901 being engine controller. The video controller 916 develops image information in bit map data, and transmits the data to the system controller 901 as a video signal. The video controller 916 transmits a print reservation command and a print starting command to the system controller 901 for each page of a recording medium (every recording medium).

The system controller 901 collectively controls the printing operation of the color laser printer 128 on the basis of the video signal, the print reservation command, and the print starting command which have been transmitted by the video controller 916.

Upon receiving the print instruction from the host computer 917, the video controller 916 first transmits the print reservation command to the system controller 901, and thereafter transmits the print starting command to the system controller 901 at timing of getting into the printable state.

The system controller 901 conducts a print execution preparation in the order of the print reservation command from the video controller 916, and waits for the print starting command from the video controller 916. Upon receiving the print starting command, the system controller 901 outputs a /TOP signal being a reference timing of the output start of the video signal to the video controller 916, and starts the printing operation according to information of the print reservation command.

The system controller 901 mainly assumes the roles of the drive of respective loads within the color laser printer 128, information gathering and analysis of the sensors, and exchanges of data with a display portion 906, that is, a user interface. An internal constitution of the system controller 901 is equipped with a CPU 903 for assuming the above-mentioned roles. The CPU 903 executes diverse sequences related to predetermined image formation with the aid of a timer 902 according to programs stored in a ROM 904 included in the system controller 901 likewise. In this situation, in order to store necessary data, a RAM 905 is also equipped. In the RAM 905, stored are, for example, a high voltage setting value for a high voltage control portion 908 that is described later, various data that is described later, image formation instruction information from the display portion 906 or the video controller 916, etc.

The system controller 901 acquires information on print conditions (for example, the size of a recording medium, the speed of image formation, the setting value of image density, etc.) set by a user, from the display portion 906 or the video controller 916. Information on a state of the color laser printer 128, for example, the number of image formation pages, or whether image formation is being executed or not, and data for indicating the occurrence of jamming or a jammed portion to the user are sent from the system controller 901 to the display portion 906 or the video controller 916.

The color laser printer 128 has multiple motors, DC loads such as a clutch or solenoid, and sensors such as a photo interrupter arranged at respective portions of the interior thereof. That is, the motors and the respective DC loads are appropriately driven to execute the conveyance of a recording medium and the drive of the respective units, and their operations are monitored by the diverse sensors. The system controller 901 detects signals from the diverse sensors by means of a sensor input portion 911, and controls the stop and drive of the respective motors by means of a motor control portion 909 on the basis of the detection signals. At the same time, a DC load control portion 910 allows the clutch/solenoid to operate, to thereby smoothly proceed image forming operation. Diverse high voltage control signals are sent to the high voltage control portion 908, thereby applying an appropriate high voltage to the respective following rollers which constitute a high voltage unit 914. That is, an appropriate voltage is applied to charge rollers 111 to 114 (charging unit), developing rollers 105 to 108 (developing unit), primary transferring rollers 119 to 122 (first transferring unit), a secondary transferring roller 126 (second transferring unit), etc., as illustrated in FIG. 2. A fixing heater 915 is incorporated into a fixing roller 157 functioning as a heater of a fixing unit 155, and each heater is on/off controlled by an AC driver 912. In this situation, the fixing roller 157 is equipped with a thermistor 913 functioning as a temperature detector for measuring a temperature of the fixing roller 157. A change in a resistance value of the thermistor 913 according to a change in a temperature of the fixing roller 157 is converted into a voltage value by the A/D converter 907, and thereafter the voltage value is input to the system controller 901 as a digital value. The AC driver 912 is controlled on the basis of the temperature data.

(Configuration and Operation of Color Laser Printer)

A description is given of the configuration and operation of the color laser printer as the image forming apparatus with reference to FIG. 2.

A full color laser printer 128 (hereinafter referred to simply as "color laser printer") is of a so-called "inline system". The color laser printer 128 has four photosensitive drums 101, 102, 103, and 104 (image bearing members, photosensitive members), and form toner images of four colors in a superimposing manner at one time with the aid of an intermediate transferring belt 123 (intermediate transfer member) being a belt-like transfer material, thereby obtaining a full color image.

Around the respective photosensitive drums 101 to 104, the charge rollers 111 to 114 being the charging units for charging the photosensitive drums 101 to 104 to a uniform potential and the developing rollers 105 to 108 being developing units are arranged. Process cartridges 115 to 118 unitized with those members are detachably attached to a laser printer main body. The developing rollers 105 to 108 can be abutted against or spaced apart from the photosensitive drums 101 to 104, respectively. The operation is conducted by driving a development abutting/spacing motor (not shown).

Hereinafter, a description is given in detail of the process cartridge 115 described above. Since other three process cartridges 116 to 118 similarly have the same configuration, their description is omitted. The process cartridge 115 is for toner of yellow (Y), the process cartridge 116 is for toner of magenta (M), the process cartridge 117 is for toner of cyan (C), and the process cartridge 118 is for toner of black (K).

The process cartridge 115 has a photosensitive drum 101 rotatably supported. The photosensitive drum 101 is a general organic photosensitive drum with a basic configuration of a conductive base body made of aluminum or the like, and a photoconductive layer formed on the outer periphery thereof, which is rotationally driven by a drum motor being driving unit (not shown) in a direction indicated by an arrow of FIG. 2.

The charge roller 111 is disposed above the photosensitive drum 101. The charge roller 111 comes in contact with the surface of the photosensitive drum 101 to uniformly charge the surface to a given polarity, a negative polarity in this embodiment, and a given potential. The charge roller 111 is made up of a conductive cored bar arranged in the center thereof and a conductive layer formed on the outer periphery thereof. The charge roller 111 is rotatably supported, and arranged substantially in parallel to the photosensitive drum 101 so as to be pressed toward the center of the photosensitive drum 101 by pressing unit (not shown). The charge roller 111 is followingly rotated along with the rotation of the photosensitive drum 101 in the direction indicated by the arrow.

The charge roller 111 is applied with a bias voltage by means of a high voltage power supply for charging (not shown), thereby uniformly contact-charging the surface of the photosensitive drum 101.

A downstream side of the charge roller 111 along the rotating direction of the photosensitive drum 101 is irradiated with a laser beam L1 from a scanner unit 109 as an exposure portion. The scanner unit 109 scans the photosensitive drum 101 with the laser beam while the laser beam is turned on/off according to the image formation for exposure so as to change the potential of the exposed area, thereby forming an electrostatic latent image corresponding to the image information on the photosensitive drum 101. The scanner unit 109 executes exposure for yellow and magenta, and the scanner unit 110 executes exposure for cyan and black. Laser beams L2 to L4 are irradiated from the scanner units 109 and 110.

On a downstream side of a position irradiated with the laser beam L1, the developing roller 105 is rotatably located. The developing roller 105 is driven under the control so as to be abutted against the photosensitive drum 101 at the time of forming an image, and spaced apart therefrom at the time of not forming an image. To the developing roller 105, toner being developer is supplied from a developer container (not shown). A development bias voltage is applied to the developing roller 105 by means of a high voltage power supply for development (not shown), thereby attaching toner onto the exposed area of the photosensitive drum surface to develop the electrostatic latent image as a toner image (visible image).

On a downstream side of the developing roller 105, the primary transferring roller 119 is disposed below the photosensitive drum 101 with the intermediate transferring belt 123 interposed therebetween. The primary transferring roller 119 is made up of the grounded cored bar and the conductive layer formed in a cylindrical shape on the outer periphery thereof. A primary transfer bias is applied to the primary transferring roller 119 by means of a high voltage power supply for primary transfer (not shown). Both ends of the primary transferring roller 119 in a longitudinal direction thereof are pressed toward the center of the photosensitive drum 101 by means of a pressing member such as a spring (not shown). With the above-mentioned configuration, the conductive layer of the primary transferring roller 119 is brought in pressure contact with the surface of the photosensitive drum 101 through the intermediate transferring belt 123 by a given pressing force, and a transfer nip portion is formed between the photosensitive drum 101 and the primary transferring roller 119.

The intermediate transferring belt 123 is nipped in the transfer nip portion, and toner charged by a potential difference between the surface of the photosensitive drum 101 and the primary transferring roller 119 is transferred from the surface of the photosensitive drum 101 onto the surface of the intermediate transferring belt 123. This transfer is called “primary transfer”.

Attachment such as residual toner is removed from the photosensitive drum 101, from which the toner image has been transferred, by means of a cleaner (not shown).

The intermediate transferring belt 123 is set up by three rollers including a counter roller 127 of the secondary transferring roller 126 and a tension roller 125, and rotationally driven in a direction indicated by arrows of those three rollers. The intermediate transferring roller 123 is made of a dielectric resin such as polycarbonate (PC), polyethylene terephthalate (PET), or polyvinylidene-fluoride (PVDF). The primary transferring roller 119 is formed of a conductive urethane sponge.

Toner images of the respective colors formed on the photosensitive drums 101 to 104 are sequentially transferred onto the intermediate transferring belt 123 as described above. Thereafter, the toner image is carried up to the secondary transfer portion made up of the secondary transferring roller 126 and the counter roller 127 of the secondary transferring roller 126 along with rotation of the intermediate transferring belt 123.

A recording medium is housed in a feed cassette 140. The laser printer according to this embodiment is equipped with a pickup roller 144 and a conveyor roller 148 which function as convey unit for conveying the recording medium to the secondary transfer portion, and a registration roller 160.

The recording medium within the feed cassette 140 is fed by the pickup roller 144 at timing when a print instruction command from the video controller 916 is output to the system controller 901. The recording medium is conveyed by the conveyor roller 148, and then conveyed toward the secondary transfer portion made up of the secondary transferring roller 126 and the counter roller 127 by means of the registration roller 160.

When a leading end of the recording medium is detected by a registration sensor 161 being a recording medium presence/absence detection sensor, the conveyor roller 148 and the registration roller 160 are temporarily stopped into a standby state. The system controller 901 outputs a /TOP signal being an image formation start signal to the video controller 916. The video controller 916 outputs video data in synchronism with the /TOP signal to start exposure. The system controller 901 restarts the drive of the conveyor roller 148 and the registration roller 160 at predetermined timing from the /TOP signal. Then, the recording medium being in the standby state starts to move, and is conveyed to the secondary transfer portion.

In this embodiment, conveying the recording medium from the feed cassette 140 is called “paper feeding”, and restarting the drive from the stop state is called “paper re-feeding”.

The paper feeding and the paper re-feeding are executed at the predetermined timing from the start of exposure, thereby superimposing the toner image formed on the intermediate transferring belt 123 on the recording medium at the secondary transfer portion just in an appropriate manner. As a result, the toner image is secondarily transferred onto the recording medium without any displacement. In this situation, to the secondary transferring roller 126, a high voltage of a positive polarity is applied as a secondary transfer bias by means of a secondary transfer high voltage power supply 132. The recording medium onto which the toner image has been transferred is thereafter conveyed toward the fixing unit 155.

Untransferred toner that has remained on the intermediate transferring belt 123 with failing to be transferred to the recording medium is scraped off from the intermediate transferring belt 123 by means of a cleaning blade 131, and then recovered into a waste-toner container (not shown). As a result, the intermediate transferring belt 123 is cleaned, and prepares for subsequent image formation.

The fixing device 155 includes the fixing roller 157 rotatably disposed, and a pressure roller 156 that rotates while being in pressure contact with the fixing roller 157. A fixing heater 915 (refer to FIG. 1) such as a halogen lamp is disposed in the interior of the fixing roller 157, and an electric power supplied to the fixing roller 915 is controlled, thereby adjusting a temperature of a surface of the fixing roller 157.

When the recording medium is conveyed to the fixing unit 155, the fixing roller 157 and the pressure roller 156 rotate at a given speed, and the recording medium is pressed and heated from both front and rear surfaces thereof at substantially constant pressure and temperature when the recording medium passes between the fixing roller 157 and the pressure roller 156. As a result, the unfixed toner image on the recording medium surface is melted and fixed on the recording medium to form a final image of full colors.

The recording medium on which the full color image has been fixed is discharged onto a paper discharge tray 129 (outside of the image forming apparatus) on an upper portion of the printer after having passed through a discharge sensor 130.

The above-mentioned description is the outline of the image formation in the color laser printer.

(Operation of Color Laser Printer)

Figure 3:
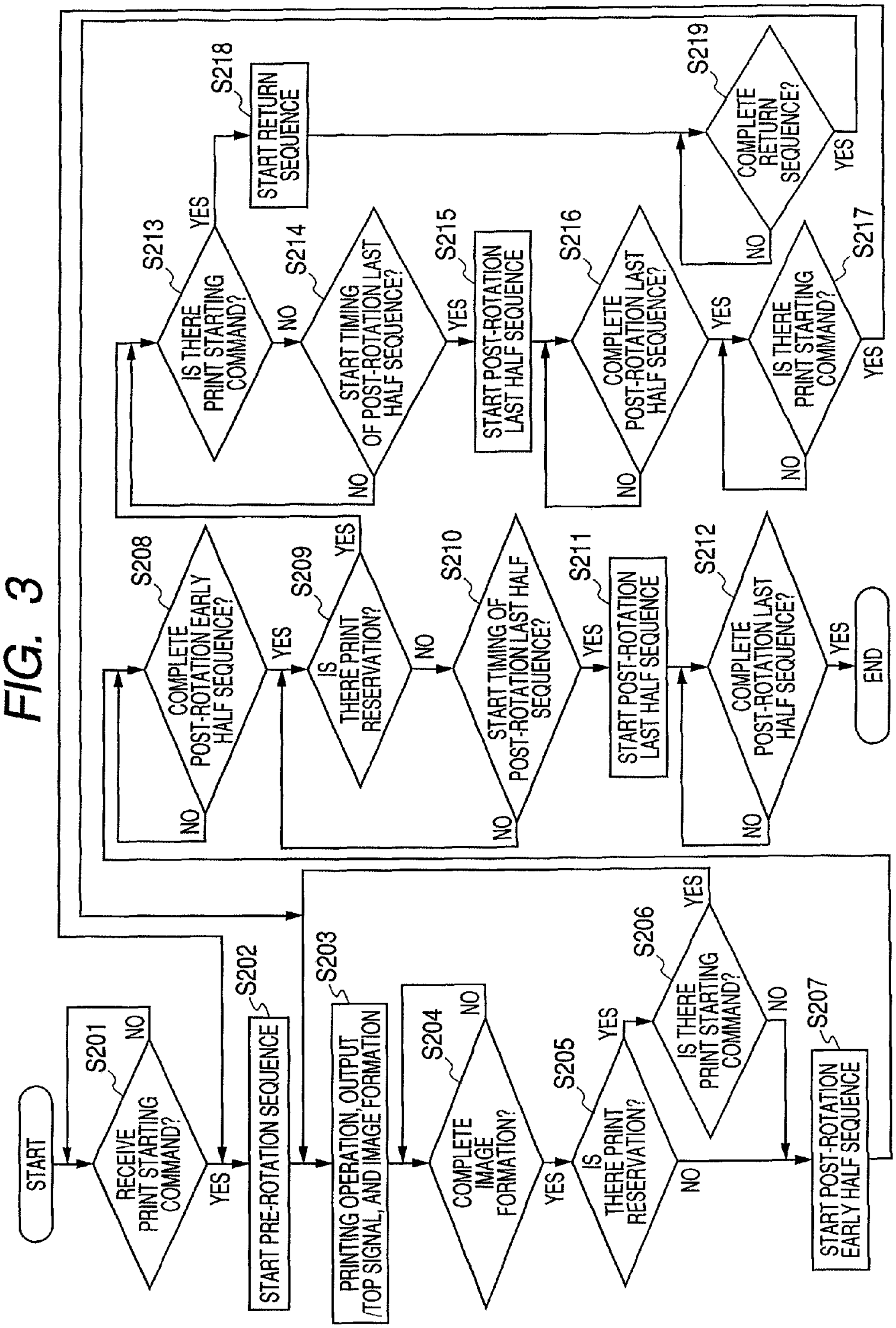
FIG. 3 illustrates a flowchart for describing an image forming operation according to the first embodiment.

A description of the operation of the color laser printer is given according to this embodiment with reference to a flowchart of FIG. 3.

Upon receiving a print reservation command from the video controller 916, the system controller 901 waits for reception of the print starting command (Step S201, hereinafter "Step" is omitted), and executes a pre-rotation sequence being a pre-processing for performing printing operation (S202). The pre-rotation sequence includes start of driving the scanner units 109 and 110, the photosensitive drums 101 to 104, the intermediate transferring belt 123, the fixing unit 155, and so on, and the abutment of the developing rollers 105 to 108 against the photosensitive drums 101 to 104. The pre-rotation sequence also includes the high voltage application to the charge rollers 111 to 114, the developing rollers 105 to 108, the primary transferring rollers 119 to 122, and so on. After completion of the pre-rotation sequence, the system controller 901 outputs the /TOP signal, and starts printing operation and image formation according to a print starting command for first sheet (S203). The system controller 901 waits for completion of toner image formation, that is, image formation for one page on the intermediate transferring belt 123 (S204). After completion of the image formation, the system controller 901 determines whether there is a subsequent print reservation from the video controller 916 or not (S205). When there is the subsequent print reservation, the system controller 901 determines whether there is a print starting command or not (S206), and when there is the print starting command, the system controller 901 continuously starts the subsequent printing operation (S203). When there is no print starting command in S206, or when there is no print reservation command in S205, the system controller 901 executes the post-rotation early half sequence (first post-processing step) (S207). The post-rotation early half sequence includes a process of stopping the unit related to the above-mentioned image formation. In this embodiment, the following stopping process is performed. First, the developing rollers 105 to 108 are spaced apart from the photosensitive drums 101 to 104, and the high voltage application to the developing rollers 105 to 108 is stopped (the stop may be an application stopping process in the cartridge being at least one consumable). Then, the high voltage application (partial process of the post-processing process) to the primary transferring rollers 119 to 122 is stopped.

The system controller 901 waits for completion of the post-rotation early half sequence (S208), and after the completion thereof, checks whether the print reservation command has been received from the video controller 916 or not (S209). When the system controller 901 receives no print reservation command till the start timing of the post-rotation last half sequence (second post-processing step) (S210), the system controller 901 executes the post-rotation last half sequence (S211), waits for completion of the post-rotation last half sequence (S212), and completes the printing operation.

The post-rotation last half start timing is timing when the recording medium is discharged from the color laser printer, which is timing at which a rear end of the recording medium passes through the discharge sensor 130 of FIG. 2.

The post-rotation last half sequence is a process of stopping the remaining operations that do not stop in the post-rotation early half among the operations that are started up in the pre-rotation sequence (process of the post-processing step except for the process executed in the first post-processing step). That is, in this embodiment, the post-rotation last half sequence includes the stop of driving the scanner units 109 and 110, the photosensitive drums 101 to 104, the intermediate transferring belt 123, the fixing unit 155, and so on, and the stop of the high voltage application to the charge roller.

When the system controller 901 receives the print reservation command from the video controller 916 after completion of the post-rotation early half sequence in S209, the system controller 901 checks whether the print starting command has been received from the video controller 916 or not (S213). When the system controller 901 receives the print starting command, the system controller 901 executes a return sequence (returning process) for returning the post-rotation early half state to the print state (S218).

The return sequence is a process of shifting from the post-rotation early half state being a state after execution of the post-rotation early half sequence and before execution of the post-rotation last half sequence, to the print state in which image formation is enabled again. In order to return the processing executed in the post-rotation early half sequence to a former print state, the return sequence includes the following operation. That is, the operation is the abutment of the developing rollers 105 to 108 against the photosensitive drums 101 to 104, the start of the high voltage application to the developing rollers 105 to 108, and the high voltage application to the primary transferring rollers 119 to 122. The processing executed in the post-rotation early half sequence is the spacing of the developing rollers 105 to 108 apart from the photosensitive drums 101 to 104, the stop of the high voltage application to the developing rollers 105 to 108, and the stop of the high voltage application to the primary transferring rollers 119 to 122.

The system controller 901 waits for completion of the return sequence (S219), and starts the subsequent printing operation (S203).

When the system controller 901 does not receive the print starting command in S213, the system controller 901 waits for the print starting command till the post-rotation last half start timing (S214). When the system controller 901 does not receive the print starting command till the post-rotation last half start timing, the system controller 901 executes the post-rotation last half sequence (S215). Thereafter, the system controller 901 waits for completion of the post-rotation last half sequence (S216). After completion of the post-rotation last half sequence, the system controller 901 checks whether the print starting command has been received or not (S217). When the print starting command has been received, the system controller 901 executes the pre-rotation sequence (S202), and starts the preparation for the subsequent printing operation. When the print starting command is not received, the system controller 901 continuously waits for reception of the print starting command.

(Comparison of this Embodiment with Conventional Example)

Figure 4:
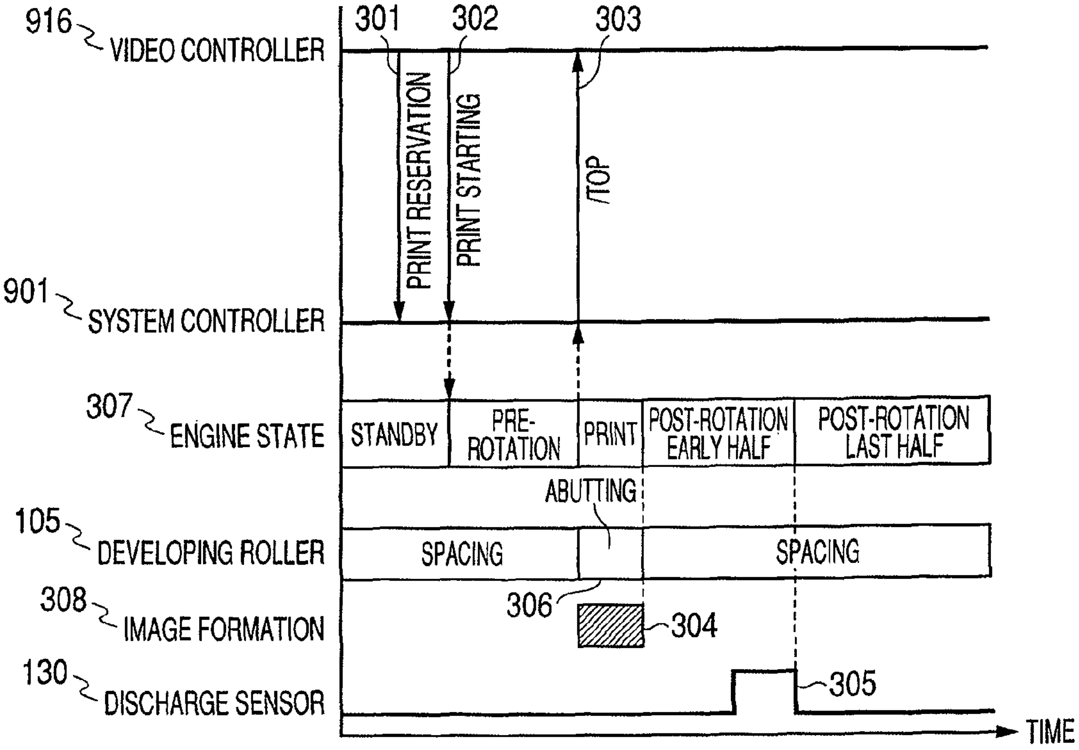
FIG. 4 illustrates a timing chart for describing an operation when one sheet is printed according to the first embodiment.

A timing chart when one sheet is printed in this embodiment is illustrated in FIG. 4.

FIG. 4 illustrates a communication between the video controller 916 and the system controller 901. In FIG. 4, there is illustrated an engine state 307 being an operating state of the color laser printer 128. In FIG. 4, there is illustrated an abutting/spacing state of the developing roller 105 among the developing rollers 105 to 108. There is illustrated an image formation timing 308 when an image for one page is formed on the intermediate transferring belt 123. A signal of the discharge sensor 130 is also illustrated.

The video controller 916 transmits a print reservation command 301 to the system controller 901, and further transmits a print starting command 302 thereto. Upon receiving the print starting command 302, the system controller 901 starts the pre-rotation sequence, and shifts the engine state from the standby state to the pre-rotation state. Upon completion of the pre-rotation sequence, the system controller 901 outputs a /TOP signal 303 to the video controller 916 to start the printing operation. In this situation, the engine state shifts from the pre-rotation state to the print state in which the printing operation is enabled. Further, the developing roller 105 changes from the spacing state to the abutting state, and the image formation is started. Upon completion of the image formation for one page (S304), the system controller 901 executes the post-rotation early half sequence. Upon execution of the post-rotation early half sequence, the developing roller 105 shifts from the abutting state to the spacing state. Thereafter, at a timing 305 when the recording medium passes through the discharge sensor 130, the system controller 901 executes the post-rotation last half sequence, and shifts the engine state to the post-rotation last half state.

From a timing chart of FIG. 4, it is found that a time 306 being in the abutting state of the developing roller 105 is only a time when the image is being formed.

Figure 5:
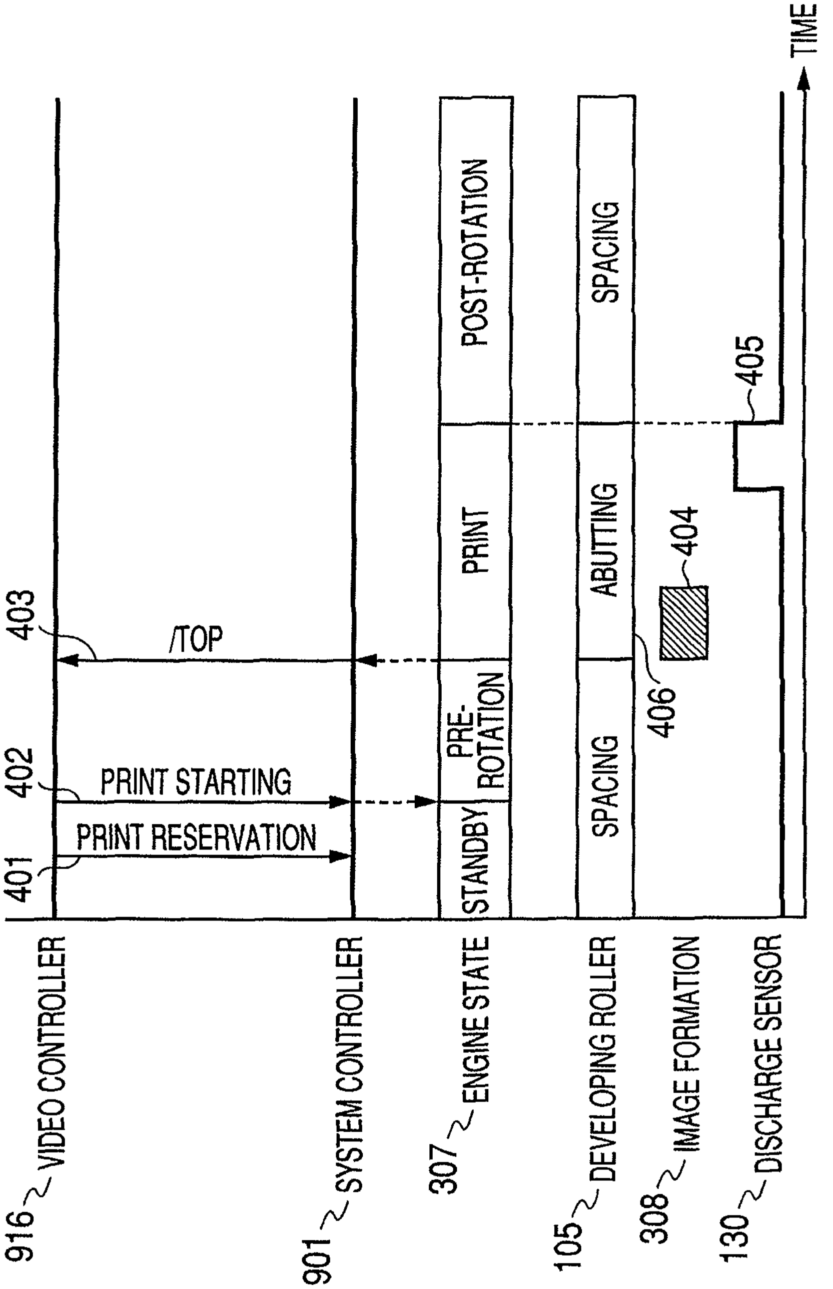
FIG. 5 illustrates a timing chart for describing an operation when one sheet is printed according to a conventional example.

FIG. 5 illustrates a timing chart of the conventional system for comparison.

In the conventional system of FIG. 5, the post-rotation sequence is put together into one sequence, and the start timing of the post-rotation is timing when the recording medium passes through the discharge sensor 130.

The meanings of the respective timings and the signals of reference numerals 401 to 405 in FIG. 5 are completely identical with those of reference numerals 301 to 305 in FIG. 4, and their description is omitted.

As indicated by reference numeral 406 in FIG. 5, the abutting state of the developing roller 105 continues even after completion of the image formation, and continues up to a timing 405 at which the recording medium passes through the discharge sensor 130.

In this embodiment illustrated in FIG. 4, since the abutting state of the developing roller 105 is shorter in time than that in the conventional example (time of 306<time of 406), the lifetime of the developing roller 105 can be prevented from being unnecessarily consumed.

Figure 6:
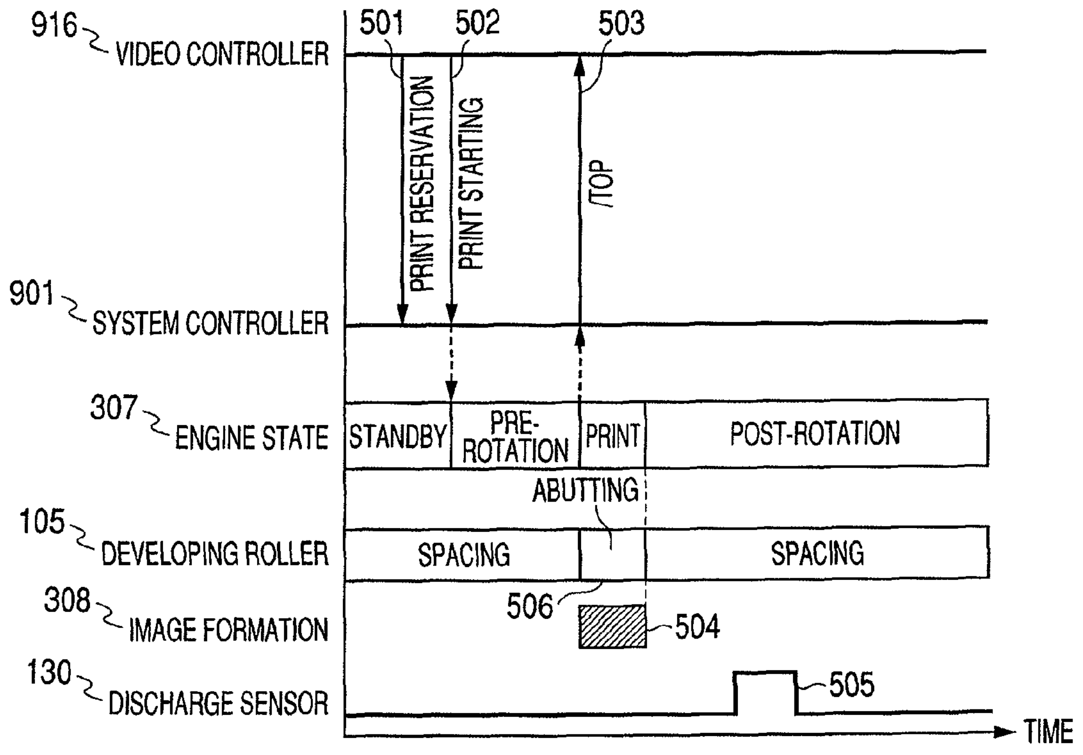
FIG. 6 illustrates a timing chart for describing the operation when one sheet is printed according to the conventional example.

On the other hand, a timing chart of a system different from that of FIG. 5 which has been executed in the conventional art is illustrated in FIG. 6.

In another conventional system of FIG. 6, the post-rotation sequence is put together into one sequence, and the post-rotation start timing is a timing when the image formation is completed. The meanings of the respective timings and the signals of reference numerals 501 to 503 and 505 in FIG. 6 are completely identical with those of reference numerals 301 to 303 and 305 in FIG. 4, and reference numerals 401 to 403 and 405 in FIG. 5, and their description is omitted. In the system illustrated in FIG. 6, the post-rotation starts at the time of completing the image formation of 504.

As illustrated by reference numeral 506 of FIG. 6, a period of time for the abutting state of the developing roller 105 is identical with a period of time during which the image is being formed, which is identical with the abutting time 306 in this embodiment illustrated in FIG. 4.

However, the system of FIG. 6 suffers from the following problem.

The problem is that the down time becomes longer when the subsequent (second sheet in this example) print reservation command and print starting command are transmitted to the system controller 901 from the video controller 916 with a delay.

Figure 7:
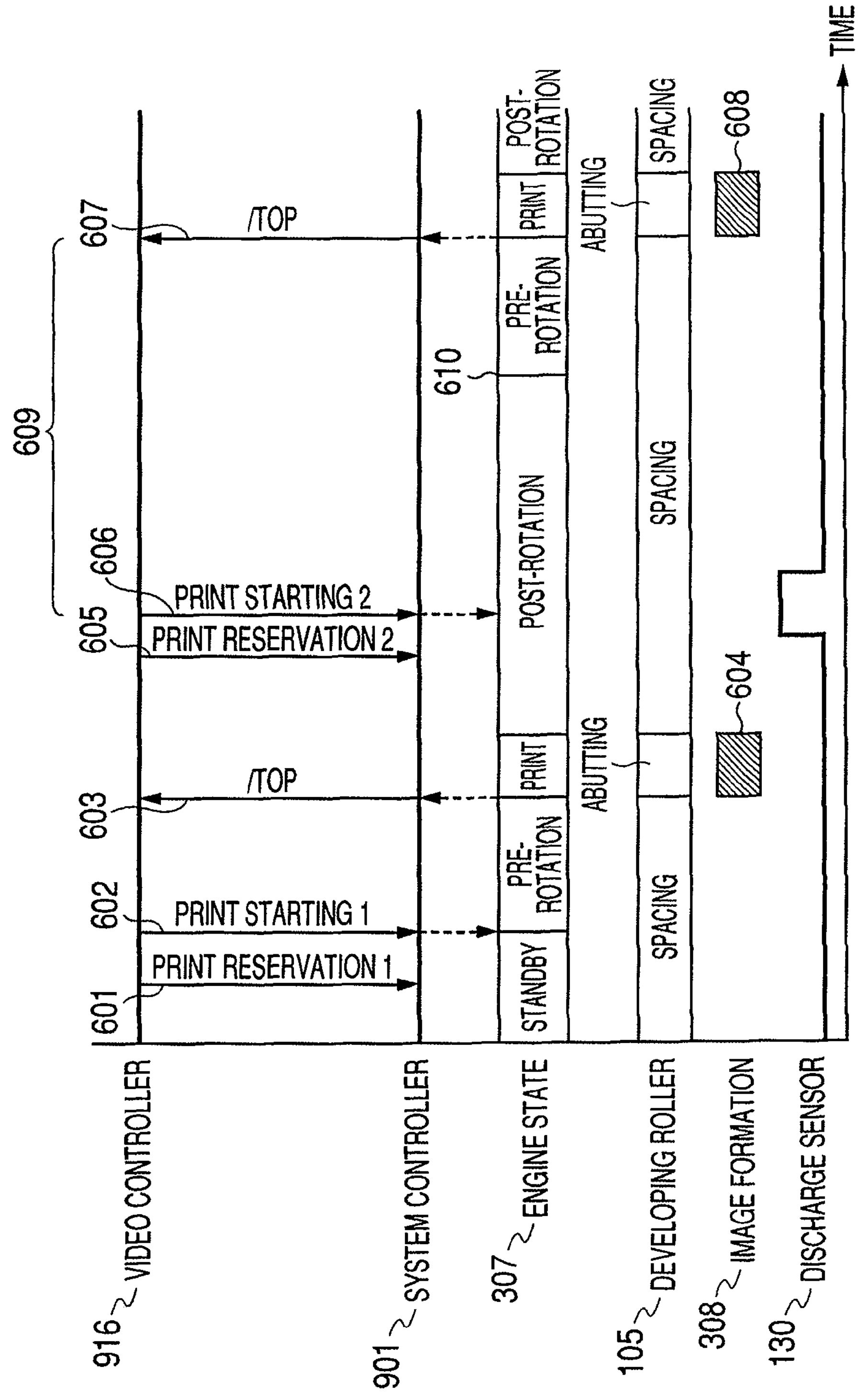
FIG. 7 illustrates a timing chart for describing an operation when a successive print reservation command and a successive print starting command are delayed according to the conventional example.

This situation is illustrated in a timing chart of FIG. 7. In FIG. 7, a print reservation command (print reservation 1) 601 for first sheet is transmitted to the system controller 901 from the video controller 916, and subsequently, a print starting command (print start 1) 602 for first sheet is transmitted. At this timing, the system controller 901 starts the pre-rotation sequence, and changes the engine state to the pre-rotation state. At the time of completing the pre-rotation state, the system controller 901 outputs the /TOP signal 603 to the video controller 916, brings the developing roller 105 into the abutting state from the spacing state, and brings the engine state into the print state to start the printing operation. At a timing 604 when the image formation for one page has been completed, the post-rotation sequence starts. During execution of the post-rotation sequence, a print reservation command (print reservation 2) 605 for second sheet and a print starting command (print start 2) 606 for second sheet are transmitted from the video controller 916. The system controller 901 cannot stop the post-rotation sequence on the way, and hence the system controller 901 executes the post-rotation sequence to the end. After completion of the post-rotation sequence, the system controller 901 starts the pre-rotation sequence (610). The system controller 901 outputs the /TOP signal 607 to the video controller 916 at the time of completing the pre-rotation sequence, and starts the printing operation for second sheet. A time difference 609 indicates a period of time since the print starting command for second sheet is transmitted until the printing operation for second sheet starts. This period of time is called "down time" because the printing operation is disenabled. At a timing 608, the image formation for second sheet is completed.

Figure 8:
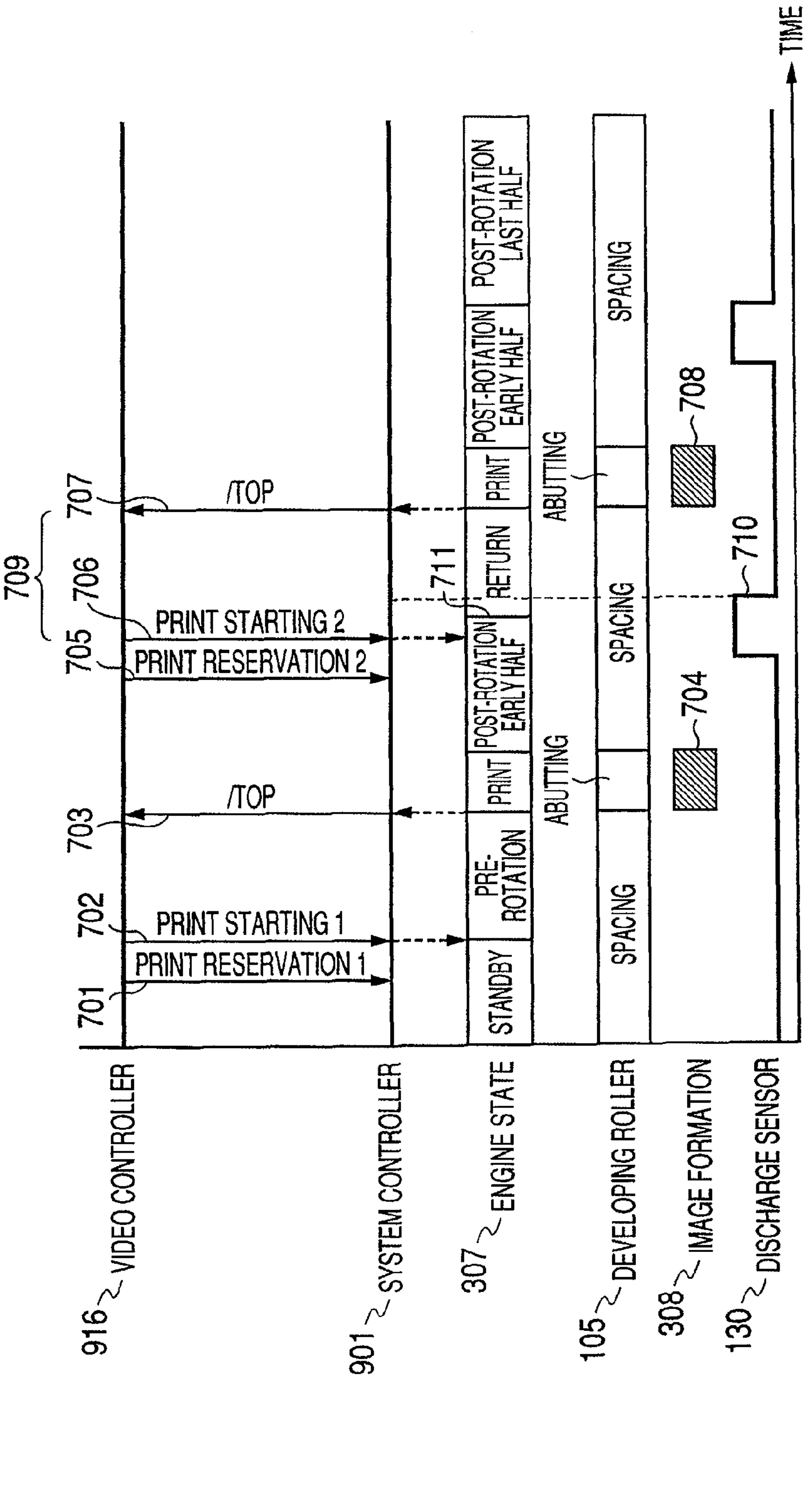
FIG. 8 illustrates a timing chart for describing an operation when a successive print reservation command and a successive print starting command are delayed according to the first embodiment.

On the other hand, in this embodiment of the present invention, the same operation as that in FIG. 7, that is, the operation when the print reservation command for second sheet and the print starting command for second sheet are delayed is illustrated in a timing chart of FIG. 8

Referring to FIG. 8, the meanings of the respective timings and the signals of reference numerals 701 to 703 and 708 are identical with those of reference numerals 601 to 603 and 608 of FIG. 7, and their description is omitted. At a time point 704 of completing the image formation for one page, the system controller 901 starts the post-rotation early half sequence, and shifts the engine state 307 to the post-rotation early half state. The system controller 901 receives a print reservation command for second sheet (print reservation 2) 705 and a print starting command for second sheet (print start 2) 706 when the engine state 307 is in the post-rotation early half state. The system controller 901 waits for completion of the post-rotation early half sequence, and starts the return sequence (711). Then, upon completion of the return sequence, the engine state again shifts to the print state where the printing operation is enabled, and the system controller 901 outputs a /TOP signal 707 for second sheet to the video controller 916 and starts the printing operation for second sheet. A time difference 709 since the print starting command for second sheet is transmitted until the printing operation for second sheet starts is a down time, and is shorter than the down time of the time difference 609 of FIG. 7. The reason is stated below. That is, while an execution time of two long sequences being the post-rotation sequence and the pre-rotation sequence is included in the time difference 609, an execution time of the post-rotation early half sequence shorter than the post-rotation sequence and the return sequence shorter than the pre-rotation sequence is included in the time difference 709.

Further, the above-mentioned reason is that the post-rotation early half sequence executes only a part of all processing performed by the post-rotation sequence, and the return sequence also executes only a part of all processing performed by the pre-rotation sequence.

In the color laser printer according to this embodiment, a real down time is measured. The down time is measured under a condition where the print reservation command and the print starting command are received immediately after completion of the image formation, and immediately after the post-rotation sequence or the post-rotation early half sequence has started. In the case of using the conventional system illustrated in FIG. 7, a period of time of the time difference 609 of FIG. 7 is 14.3 seconds. On the other hand, in the case of using the system of this embodiment illustrated in FIG. 8, there is obtained the result that a period of time of the time difference 709 of FIG. 8 is 6.1 seconds. It is understood that the system of this embodiment can reduce the down time.

The above-mentioned description is summarized as follows.

This embodiment can further shorten the abutting time of the developing roller 105 compared with a case where the post-rotation is conducted at timing when the recording medium is discharged from the color laser printer (FIG. 5) which is one of the conventional systems. As a result, the lifetime of the developing roller can be prevented from being unnecessarily consumed.

Further, when the post-rotation is conducted after completion of the image formation which is another conventional system (FIG. 6), the same abutting time of the developing roller 105 as that in this embodiment can be provided. However, when the print reservation command and the print starting command are delayed, there arises such a problem that the down time becomes longer (FIG. 7). This embodiment can shorten the down time when the print reservation command and the print starting command are delayed (FIG. 8).

The conventional art cannot realize, at the same time, both of that the consumption of the process cartridge component such as the developing roller is suppressed, and that the down time occurring when the print reservation command and the print starting command are delayed is shortened. In this embodiment, the post-rotation sequence is divided into early half and last half, and the return sequence that returns the post-rotation early half state to the print state is used, thereby enabling the two objects to be realized at the same time.

Second Embodiment

In this embodiment, when the video controller 916 transmits, to the system controller 901, the print reservation command with a delay, a command for noticing that the transmission of the print reservation command is delayed (hereinafter, the command is called "print reservation delay command") is prepared. The video controller 916 transmits the print reservation delay command to the system controller 901, thereby continuing the printing operation for a given period of time for the purpose of reducing the down time.

(Operation Using Print Reservation Delay Command in the Conventional Art)

Figure 9:
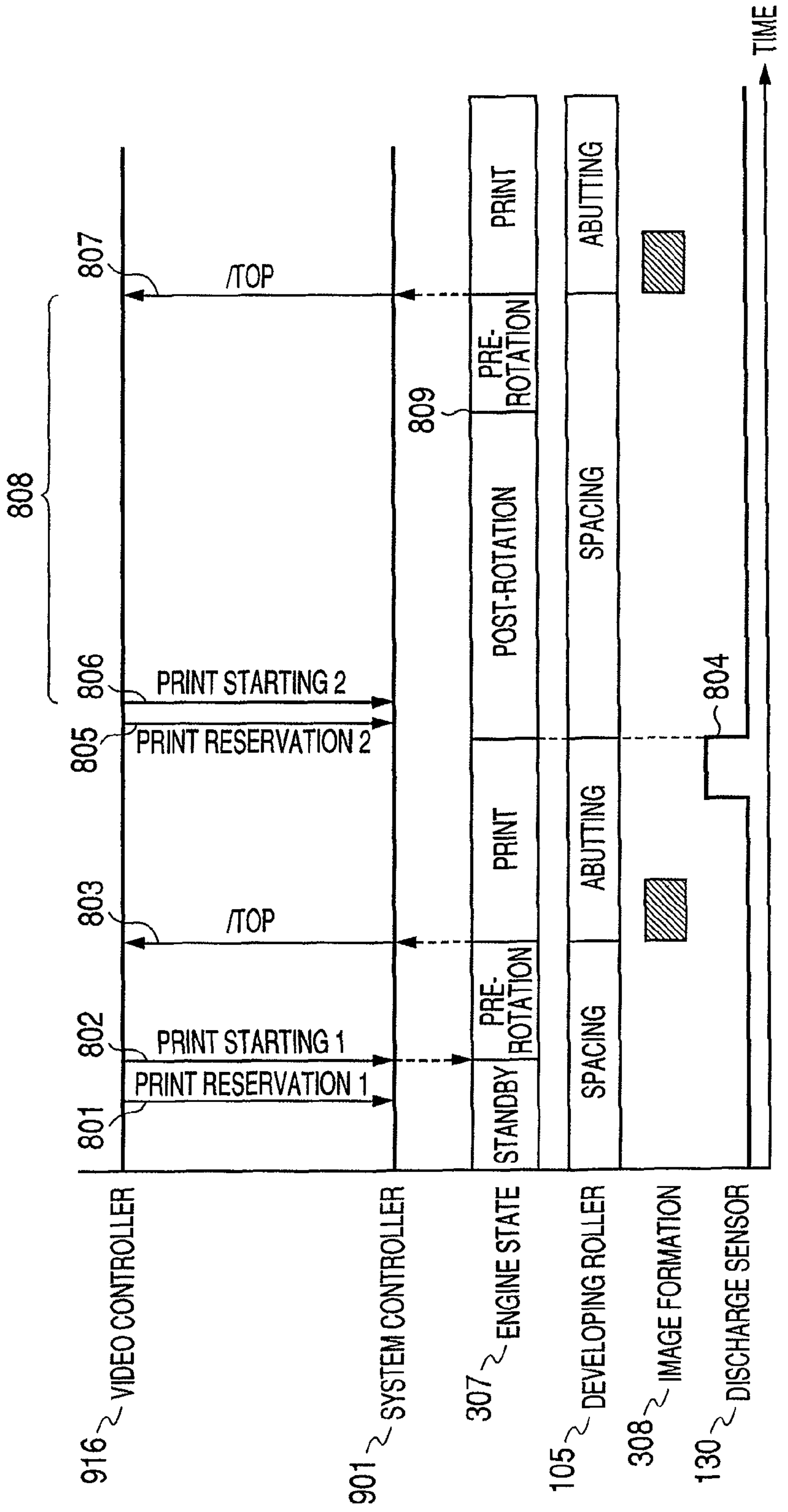
FIG. 9 illustrates a timing chart for describing the operation when the successive print reservation command and the successive print starting command are delayed according to the conventional example.

A command for noticing that the transmission of the print reservation command is delayed has been proposed in the above referenced Japanese Patent Application Laid-Open No. 2006-015515. The operation is described in brief. FIG. 9 illustrates a timing chart when the print reservation command and the print starting command from the video controller 916 are sent to the system controller 901 with a delay in the conventional system of FIG. 5 which has been described in the first embodiment. The video controller 916 transmits a print reservation command for first sheet (print reservation 1) at timing 801, and a print starting command for first sheet (print start 1) at timing 802, to the system controller 901, respectively. The system controller 901 starts the pre-rotation sequence, and outputs a /TOP signal 803 to the video controller 916 at the time of completing the pre-rotation sequence to start the printing operation. The system controller 901 starts the post-rotation sequence at timing 804 when the recording medium is discharged. Immediately after that, a print reservation command for second sheet (print reservation 2) 805 and a print starting command for second sheet (print start 2) 806 are transmitted from the video controller 916 to the system controller 901. The system controller 901 cannot conduct the printing operation, because the post-rotation sequence is being conducted. After completion of the post-rotation sequence, the pre-rotation sequence starts (809). A /TOP signal 807 for second sheet is output at the time of completing the pre-rotation sequence, and the printing operation for second sheet starts (807). A period of time 808 since the print starting command 806 for second sheet until the /TOP signal 807 for second sheet is a down time.

Figure 10:
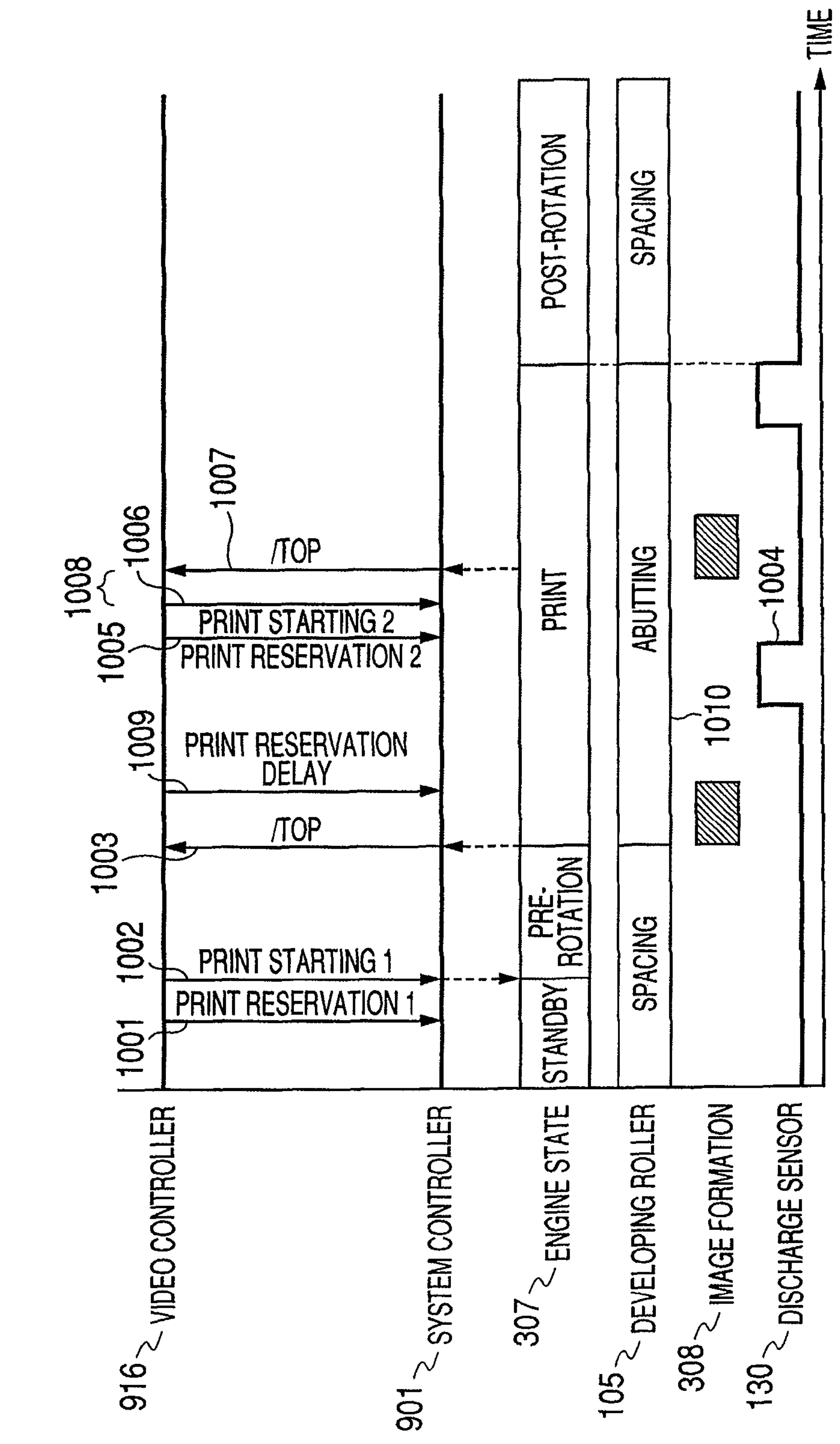
FIG. 10 illustrates a timing chart for describing an operation when a print reservation delay command is used according to the conventional example.

In the disclosure of Japanese Patent Application Laid-Open No. 2006-015515, a print reservation delay command is prepared in order to solve the above-mentioned problem. This appearance is described with reference to FIG. 10. Referring to FIG. 10, the video controller 916 transmits a print reservation command for first sheet (print reservation 1) 1001 and a print starting command for first sheet (print start 1) 1002 to the system controller 901, respectively. The system controller 901 starts the pre-rotation sequence, and outputs a /TOP signal 1003 to the video controller 916 at the time of completing the pre-rotation sequence to start the printing operation. The video controller 916 transmits notice indicating that the transmission of a print reservation command for second sheet (print reservation 2) 1005 is delayed to the system controller 901 as a print reservation delay command 1009. The system controller 901 has already received the print reservation delay command 1009, and hence the system controller 901 maintains the print state where the printing operation is enabled without starting the post-rotation sequence at timing 1004 when the recording medium is discharged. Later, the print reservation command for second sheet (print reservation 2) 1005 and a print starting command for second sheet (print start 2) 1006 are transmitted from the video controller 916 to the system controller 901. Because the system controller 901 is in a print state where the printing operation is enabled, immediately upon receiving the print starting command 1006 for second sheet, the system controller 901 outputs a /TOP signal 1007 for second sheet to the video controller 916, and can start the printing operation for second sheet. A time difference 1008 between the print starting command 1006 for second sheet and the /TOP signal 1007 for second sheet is a down time. This period of time can be as small as the period of time that can be almost ignored.

The above-mentioned description is given of the operation of an image forming apparatus having the print reservation delay command. This image forming apparatus suffers from the following problem. As indicated by reference numeral 1010 of FIG. 10, the system controller 901 receives the print reservation delay command 1009 from the video controller 916, and the developing roller 105 continues the abutting state while the engine state is continued in the print state. For that reason, during the above-mentioned state, the lifetime of the developing roller 105 is consumed.

(Operation Using Print Reservation Delay Command in This Embodiment)

A system for solving the above-mentioned problem is this embodiment, which is described with reference to a flowchart of FIG. 11. Parts identical with those of FIG. 3 are denoted by the same references, and their description is omitted.

Figure 11:
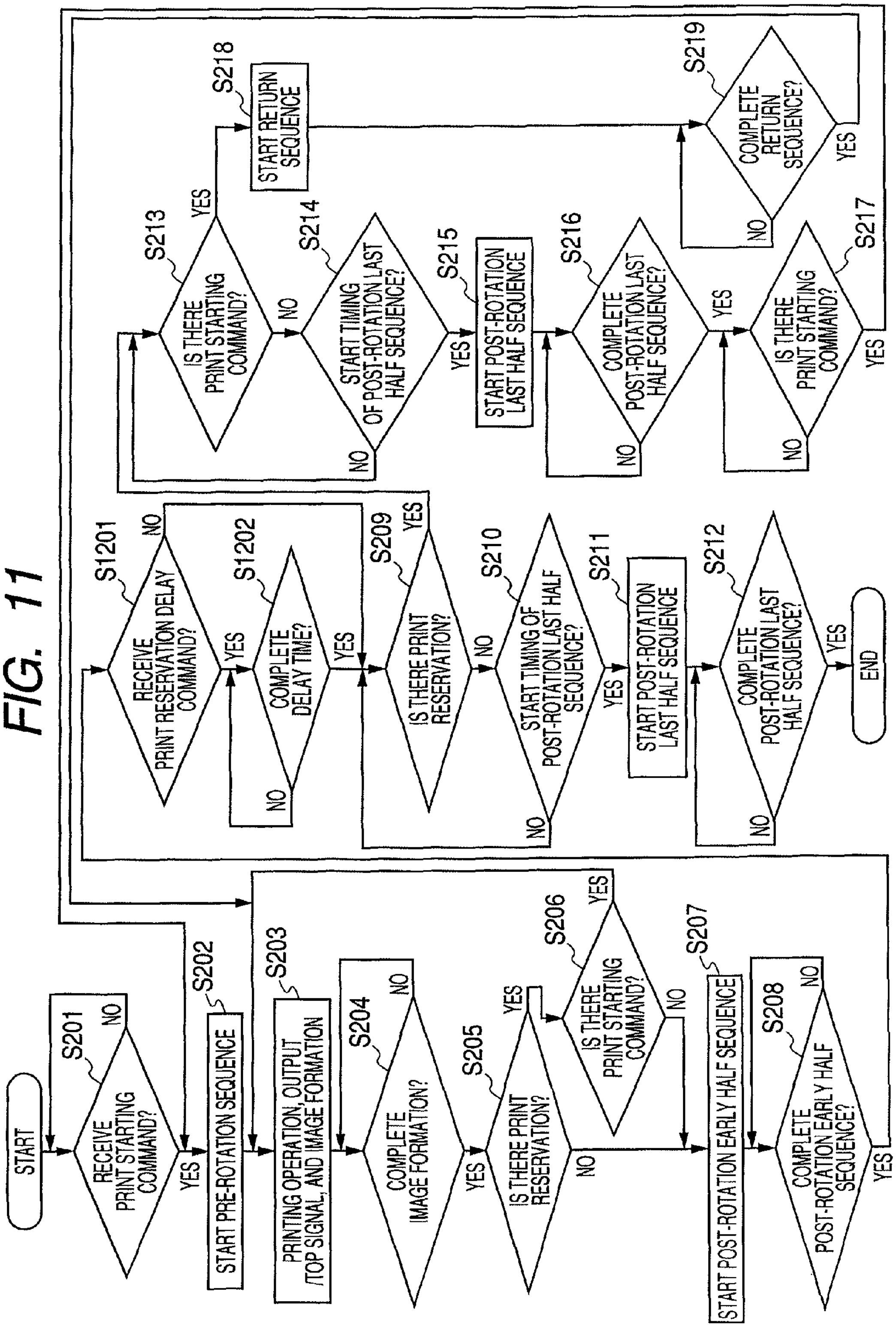
FIG. 11 illustrates a flowchart for describing an image forming operation when a print reservation delay command is used according to a second embodiment.

Referring to FIG. 11, when the system controller 901 does not receive the print reservation command (S205) after the image formation for first sheet has been completed (S204), the system controller 901 executes the post-rotation early half sequence (S207). After completion of the post-rotation early half sequence (S208), it is checked whether or not the system controller 901 has received the print reservation delay command from the video controller 916 (S1201). When the system controller 901 receives no print reservation delay command, the system controller 901 shifts to (S209), and conducts the same operation as that in the flowchart described with reference to FIG. 3. When the system controller 901 receives the print reservation delay command in S1201, the system controller 901 continuously waits for completion of the delay time (S1202). This portion is different from the flowchart of FIG. 3. That is, when the system controller 901 receives the print reservation delay command, the engine state continues to maintain the post-rotation early half state, and does not shift to the post-rotation last half sequence of S211 or S215 until the delay time is completed. For that reason, the post-rotation last half sequence does not start during that state. The delay time is a predetermined period of time, and for example, the delay time of 10 seconds is recorded in the ROM 904 within the system controller 901. When the print reservation command and the print starting command are transmitted to the system controller 901 from the video controller 916 until the delay time is completed, the post-rotation early half state can be returned to the print state through the return sequence. Then, the printing operation can be continued.

Figure 12:
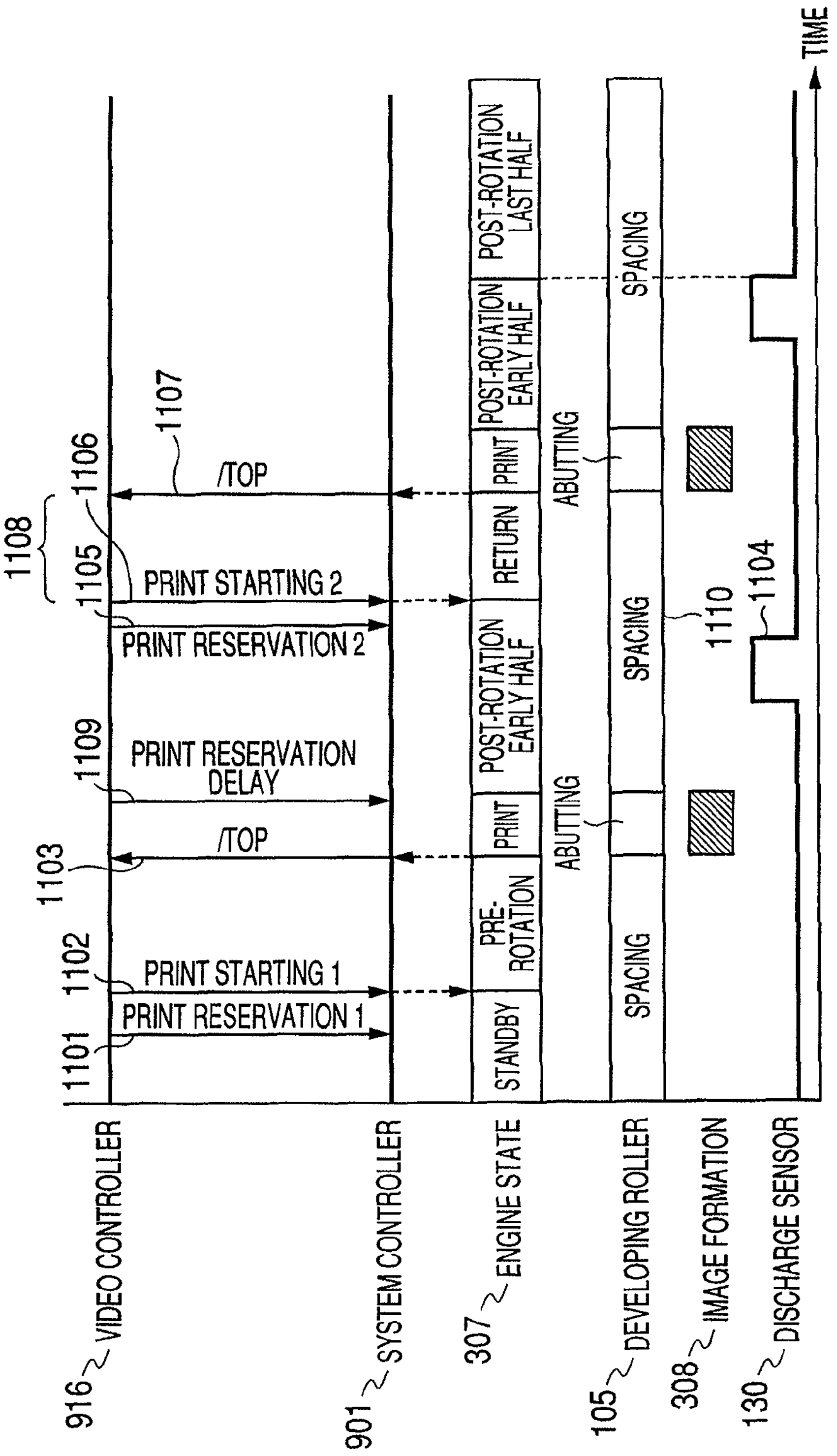
FIG. 12 illustrates a flowchart for describing an operation when the print reservation delay command is used according to the second embodiment.

FIG. 12 illustrates a timing chart according to this embodiment. This embodiment is an example under the same conditions as those of FIG. 9 or 10, that is, an example where the print reservation command for second sheet and the print starting command for second print are delayed. Further, this embodiment is an example in which the print reservation delay command is received at the same timing as that of FIG. 10.

Referring to FIG. 12, the video controller 916 transmits, to the system controller 901, the print reservation command for first sheet (print reservation 1) at timing 1101, and the print starting command for first sheet (print start 1) at timing 1102, respectively. The system controller 901 starts the pre-rotation sequence at the time of receiving the print starting command 1102, and shifts the engine state from the standby state to the pre-rotation state. When the pre-rotation sequence has been completed, the system controller 901 outputs a /TOP signal 1103 to the video controller 916. Thereafter, the system controller 901 transmits the print reservation delay command to the video controller 916 at timing 1109. The system controller 901 starts the post-rotation early half sequence after completion of the image formation. The system controller 901 receives the print reservation delay command even at a timing 1104 of the post-rotation last half start. Hence, the system controller 901 does not execute the post-rotation last half sequence, and continues to maintain the post-rotation early half state. A print reservation command for second sheet (print reservation 2) 1105 and a print starting command for second sheet (print start 2) 1106 are transmitted from the video controller 916 to the system controller 901 while waiting for elapse of a given delay time. After the given delay time has elapsed, the system controller 901 starts the return sequence. After completion of the return sequence, the system controller 901 outputs a /TOP signal 1107 for second sheet, and starts the printing operation for second sheet. A time difference 1108 between the print starting command 1106 for second sheet and the output of the /TOP signal 1107 for second sheet is a down time. The period of time is occupied by most of the return sequence, and is not a long period of time adding a post-rotation sequence and a pre-rotation sequence together as with the period of time 808 of the down time of FIG. 9. As indicated by reference numeral 1110 of FIG. 12, the engine state is in the post-rotation early half state while waiting for the elapse of the delay time, and the developing roller 105 is spaced. Accordingly, because the developing roller 105 is not kept in an abutting state as indicated by reference numeral 1010 of FIG. 10, the lifetime of the developing roller 105 is not unnecessarily consumed.

As described above, according to this embodiment, both of them can be realized at the same time, that the consumption of the process cartridge component such as the developing roller is suppressed, and that the down time occurring when the print reservation command and the print starting command are delayed is shortened.

Third Embodiment

In the second embodiment, the delay time is predetermined as 10 seconds. In this embodiment, a delay time can be designated to the system controller 901 from the video controller 916. That is, this embodiment is an example in which delay time information until transmission of the print starting command is added to the print reservation delay command transmitted from the video controller 916 to the system controller 901. The delay time information may be a delay time since the print reservation delay command is transmitted, or may be a delay time from the image formation completion timing. In this embodiment, a basis of the delay time is a delay time from the image formation completion timing, that is, the start timing of the post-rotation early half sequence.

(Operation Using Print Reservation Delay Command Added with Delay Time Information)

Figure 13:
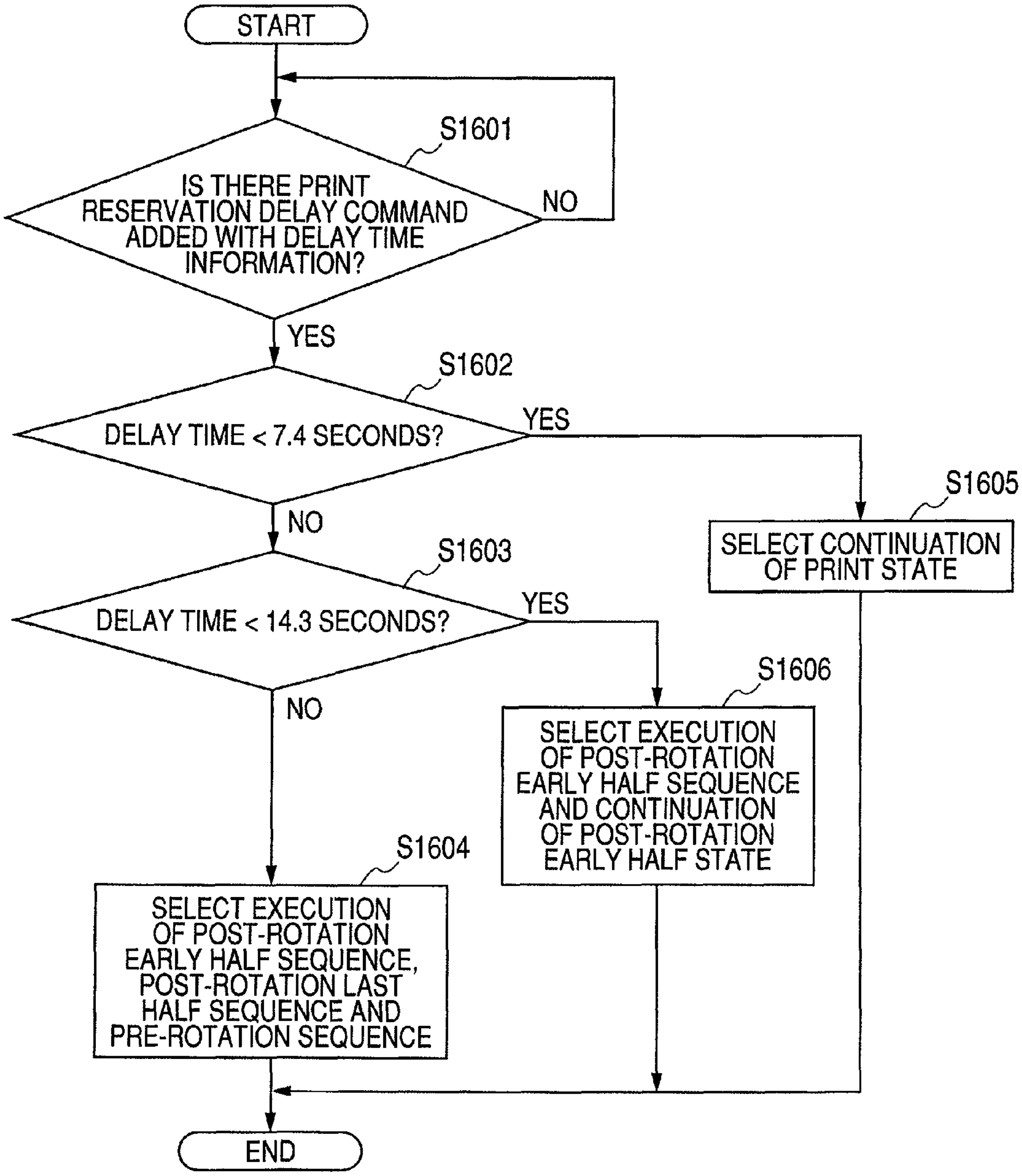
FIG. 13 illustrates a flowchart for describing processing when a print reservation delay command is received according to a third embodiment.

A flowchart of FIG. 13 illustrates processing when the system controller 901 receives the print reservation delay command added with the delay time information from the video controller 916.

Referring to FIG. 13, the system controller 901 checks whether or not the print reservation delay command added with the delay time information is transmitted (S1601). When the print reservation delay command added with the delay time information is transmitted, the system controller 901 determines whether or not the delay time is shorter than 7.4 seconds (S1602). When the delay time is shorter than 7.4 seconds, the system controller 901 selects the continuation of the print state as the engine state (S1605).

The continuation of the print state unit that the print state in which the printing operation is enabled continues as it is, without starting the post-rotation early half sequence at the time of completion of the image formation. The /TOP signal can be output immediately after the delay time has elapsed at the time when the print starting command is transmitted, in other words, a state in which the printing operation can start is continued.

In S1602 of FIG. 13, when the delay time is equal to or longer than 7.4 seconds, it is then determined whether or not the delay time is shorter than 14.3 seconds (S1603). When the delay time is shorter than 14.3 seconds, the system controller 901 selects the execution of the post-rotation early half sequence and the continuation of the post-rotation early half state (S1606). The system controller 901 executes the post-rotation early half sequence at the time of completion of the image formation, and thereafter does not execute the post-rotation last half sequence even at the start timing of the post-rotation last half sequence. That is, the system controller 901 waits for the elapse of the delay time with the engine state in the post-rotation early half state. The system controller 901 starts the return sequence in advance by estimating a timing at which the print starting command is received, and outputs the /TOP signal just at delay time elapse timing to thereby start the printing operation.

In S1603 of FIG. 13, when the delay time is equal to or longer than 14.3 seconds, the system controller 901 selects execution of the post-rotation early half sequence, the post-rotation last half sequence, and the pre-rotation sequence (S1604). The system controller 901 waits for the elapse of the delay time with the engine state in the standby state. The system controller 901 starts the pre-rotation sequence in advance by estimating a timing at which the print starting command is received, and outputs the /TOP signal just at delay time elapse timing to thereby start the printing operation.

The time of 7.4 seconds in the above description of determination of S1602 is a time period from completion of the image formation until the /TOP signal is output, in which the post-rotation early half sequence starts immediately after completion of the image formation, and the return sequence starts immediately after the completion of the post-rotation early half sequence.

The time of 14.3 seconds in the above description of determination of S1603 is a time period in which the following operation is performed immediately after completion of the image formation. After completion of the image formation, the post-rotation early half sequence starts, and thereafter, the post-rotation last half sequence is executed at the start timing of the post-rotation last half sequence, and the pre-rotation sequence starts immediately after completion of the post-rotation last half sequence, and then, the /TOP signal is output after completion of the pre-rotation. 14.3 seconds are a time period from completion of the above-mentioned image formation until the /TOP signal is output.

As described above, the system controller 901 selects the engine operation performed after completion of the image formation from the following three operations according to the delay time from the video controller 916.

The first operation is to continue the print state.

The second operation is to execute the post-rotation early half sequence, to continue the post-rotation early half state, and thereafter, to start the return sequence.

The third operation is to start the post-rotation early half sequence and the post-rotation last half sequence, and thereafter, to start the pre-rotation sequence.

Figure 14:
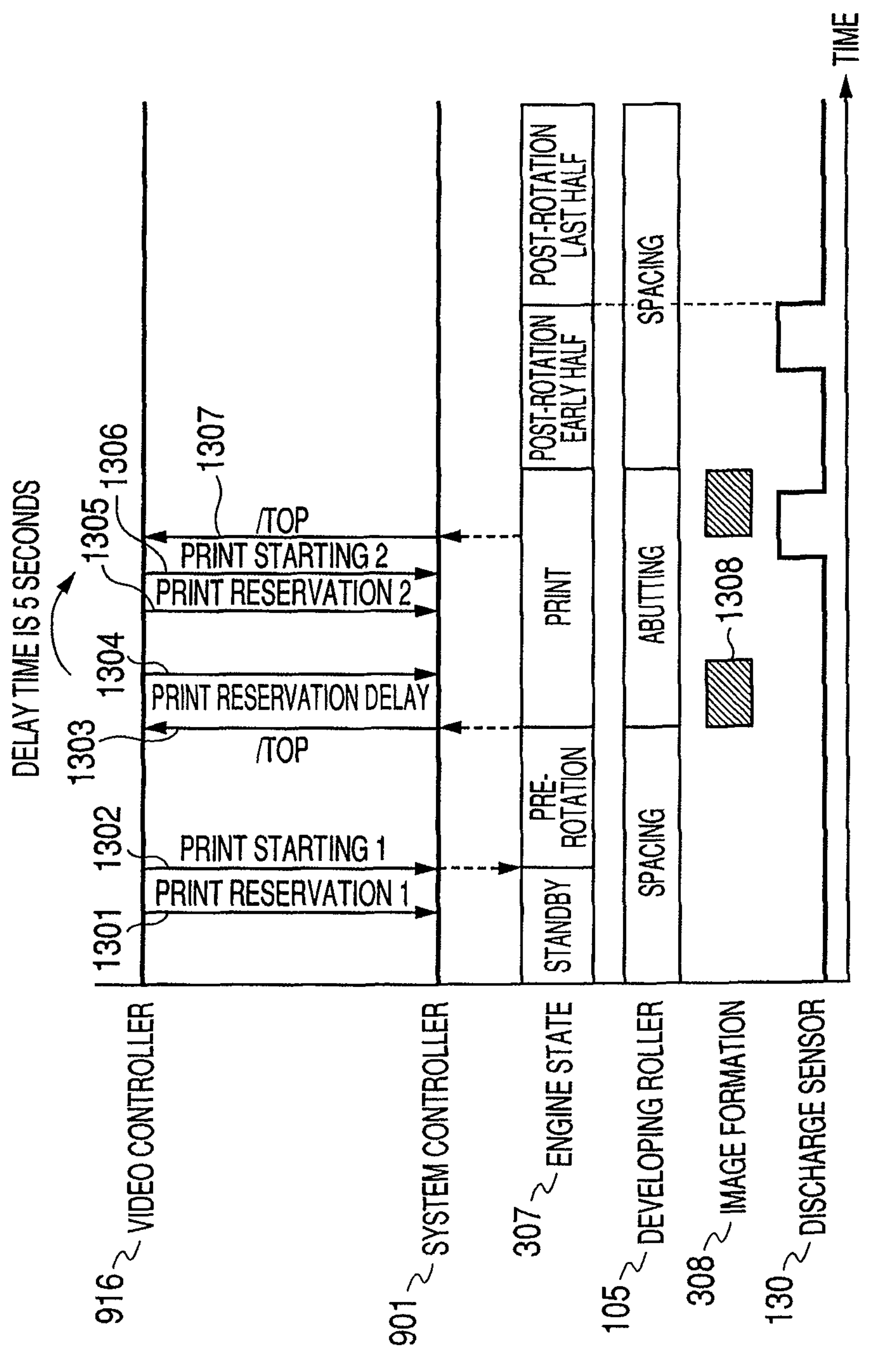
FIG. 14 illustrates a timing chart for describing an operation when a delay time is shorter than 7.4 seconds according to the third embodiment.
Figure 15:
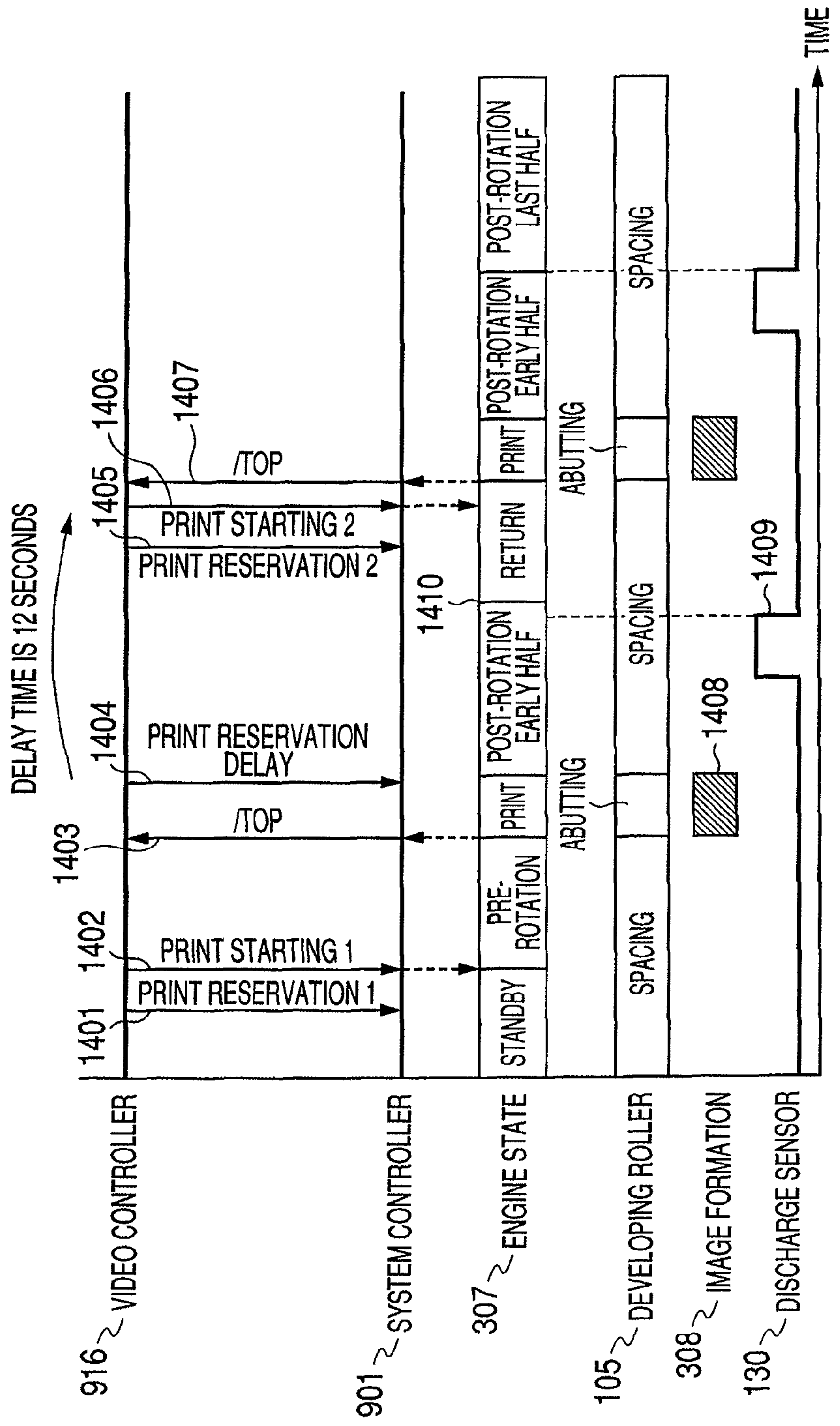
FIG. 15 illustrates a timing chart for describing an operation when the delay time is equal to or longer than 7.4 seconds and shorter than 14.3 seconds according to the third embodiment.
Figure 16:
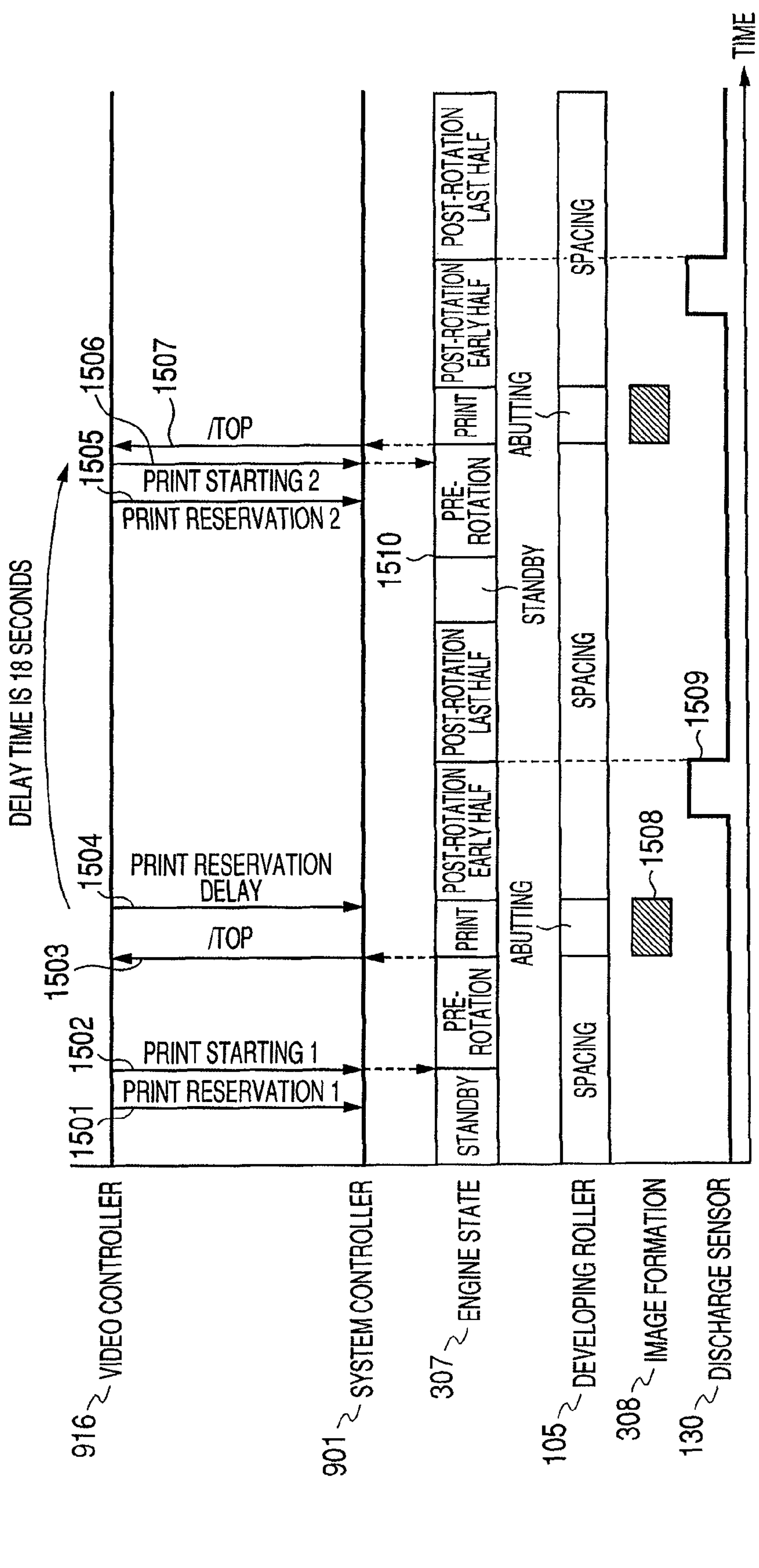
FIG. 16 illustrates a timing chart for describing an operation when the delay time is equal to or longer than 14.3 seconds according to the third embodiment.

Timing charts illustrating the respective operations are illustrated in FIGS. 14, 15, and 16. The reference numerals and the like indicated on the axis of ordinate of the timing charts are the same as those of the timing charts described in the first embodiment and the second embodiment, and therefore their description is omitted.

The first operation, that is an example in which the delay time is shorter than 7.4 seconds and the print state is continued, is illustrated in FIG. 14.

In FIG. 14, the video controller 916 transmits, to the system controller 901, the print reservation command for first sheet (print reservation 1) at timing of 1301, and the print starting command for first sheet (print start 1) at timing of 1302. Upon receiving the print starting command 1302, the system controller 901 starts the pre-rotation sequence. After completion of the pre-rotation sequence, the system controller 901 outputs the /TOP signal 1303, and starts the printing operation. The video controller 916 transmits, to the system controller 901, the print reservation delay command 1304 added with the delay time information during the printing operation. The delay time is 5 seconds. The system controller 901 does not start the post-rotation early half sequence at an image formation completion timing 1308, and continues the print state for the engine state. Thereafter, a print reservation command for the second sheet (print reservation 2) 1305 and a print starting command for the second print (print start 2) 1306 are transmitted from the video controller 916. Upon receiving the print starting command 1306, the system controller 901 outputs the /TOP signal 1307 and starts the printing operation with the down time being a time that can be almost ignored to the degree of time required for communication.

The second operation, that is an example in which the delay time is equal to or longer than 7.4 seconds and shorter than 14.3 seconds, the post-rotation early half sequence is executed, the post-rotation early half state is continued, and thereafter the return sequence is started, is illustrated in FIG. 15.

Referring to FIG. 15, reference numerals 1401, 1402, and 1403 are the same signals as 1301, 1302, and 1303 in FIG. 14, and therefore their description is omitted. The print reservation delay command 1404 added with the delay time information is transmitted from the video controller 916 to the system controller 901 during the printing operation. The delay time is 12 seconds. The system controller 901 starts the post-rotation early half sequence at image formation completion timing 1408, and shifts the engine state to the post-rotation early half state. Thereafter, the system controller 901 does not start the post-rotation last half sequence even at the post-rotation last half start timing 1409, and the engine state continues the post-rotation early half state. Since it is known that the print starting command is transmitted after the delay time of 12 seconds has elapsed, the system controller 901 starts the return sequence at a stage where the delay time of 11 seconds has elapsed prior to elapse of 12 seconds (1410). The reason that the return sequence is started at 11 seconds, which is 1 second before the delay time of 12 seconds is that it is known in advance that it takes 1 second for the /TOP signal to be able to be output from the start of the return sequence. When the delay time of 12 seconds is approaching after the return sequence starts, a print reservation command for the second sheet (print reservation 2) 1405 and a print starting command for the second sheet (print start 2) 1406 are transmitted from the video controller 916. The system controller outputs the /TOP signal for the second sheet 1407 and starts the printing operation at the time of receiving the print starting command for the second sheet 1406.

The third operation, that is an example in which the delay time is equal to or longer than 14.3 seconds, the post-rotation early half sequence and the post-rotation last half sequence are started, and thereafter the pre-rotation sequence is started, is illustrated in FIG. 16.

Referring to FIG. 16, reference numerals 1501, 1502, and 1503 are the same signals as 1301, 1302, and 1303 in FIG. 14, and therefore their description is omitted. The print reservation delay command 1504 added with the delay time information is transmitted from the video controller 916 to the system controller 901 during the printing operation. The delay time is 18 seconds. The system controller 901 starts the post-rotation early half sequence at image formation completion timing 1508, and shifts the engine state to the post-rotation early half state. Thereafter, when the post-rotation last half state timing 1509 comes, the system controller 901 starts the post-rotation last half sequence, and shifts the engine state to the post-rotation last half state. Upon completion of the post-rotation last half sequence, the engine state becomes the standby state. Since it is known that when the delay time of 18 seconds has elapsed, the print starting command is transmitted, the system controller 901 starts the pre-rotation sequence at a stage where the delay time of 16.4 seconds has elapsed prior to elapse of 18 seconds (1510). The reason that the pre-rotation sequence starts at 16.4 seconds, which is 1.6 seconds before the delay time of 18 seconds is that it is known in advance that it takes 1.6 seconds for the /TOP signal to be able to be output from the start of the pre-rotation sequence. When the delay time of 18 seconds is approaching after the pre-rotation sequence starts, a print reservation command for the second sheet (print reservation 2) 1505 and a print starting command for the second sheet (print start 2) 1506 are transmitted from the video controller 916. The system controller 901 outputs the /TOP signal 1507 for the second sheet and starts the printing operation at the time of receiving the print starting command 1506 for the second sheet.

It is described that the time of 7.4 seconds is a time period until the /TOP signal is output when the post-rotation early half sequence starts immediately after completion of the image formation, and the return sequence starts immediately after completion of the post-rotation early half sequence. This means that when the post-rotation early half sequence starts after completion of the image formation, the /TOP signal can not be output for at least 7.4 seconds. Accordingly, in the case where a time shorter than 7.4 seconds is designated as the delay time, when the post-rotation early half sequence starts after completion of the image formation, the /TOP signal is output at timing delayed from the designated delay time. The printing operation is delayed by that time. In other words, the down time other than the delay time occurs.

In this embodiment, when a time period shorter than 7.4 seconds is designated as the delay time, the print state is continued without starting the post-rotation early half sequence after completion of the image formation (FIG. 14). For that reason, when the delay time shorter than 7.4 seconds is designated, the printing operation can be performed without generating the down time other than the delay time.

In this embodiment, when a time period equal to or longer than 14.3 seconds is designated as the delay time, the post-rotation early half sequence and the post-rotation last half sequence also start, and thereafter the pre-rotation sequence starts (FIG. 16). When the time period is equal to or longer than 14.3 seconds, even when the engine state is once shifted to the standby state, the subsequent /TOP signal can be output without delaying from the designated delay time. In this case, since the standby state is maintained while waiting for elapse of the delay time, the consumable unit having a lifetime is not worn out during that state, and energy is effectively saved.

In this embodiment, when the delay time other than the above-mentioned time, that is, a time period equal to or longer than 7.4 seconds and shorter than 14.3 seconds is designated, the post-rotation early half sequence starts immediately after completion of the image formation, and the post-rotation early half state is maintained while waiting for elapse of the delay time. Thereafter, the return sequence starts, and the printing operation starts (FIG. 15). For that reason, the lifetime of the developing roller is not unnecessarily consumed while waiting for the delay time, and the down time other than the delay time does not occur.

As described above, in this embodiment, in a component whose lifetime is consumed when the printing operation continues, such as the component of the process cartridge, the variety of sequences are appropriately selected according to the time of the delay time information, whereby the consumption of the lifetime thereof can be suppressed to the minimum. At the same time, no surplus down time occurs. This embodiment can solve the two problems.

7.4 seconds and 13.4 seconds being the determination conditions of the delay time are examples of the values in the color laser printer according to this embodiment, and the values can be appropriately set according to the configuration of the image forming apparatus (the speed of the image formation, the length and configuration of a conveying path along which the recording medium is conveyed, etc.)

Other Embodiments

In the above-mentioned first to third embodiments, the post-rotation is divided into two parts, that is, early half and last half, but the present invention is not limited to two divisions, and can be changed to three or more divisions. For example, the post-rotation can be divided into three parts as follows.

First post-rotation sequence includes the operation of spacing the developing rollers 105 to 108 apart from the photosensitive drums 101 to 104, and the operation of stopping the high voltage application to the developing rollers 105 to 108.

Second post-rotation sequence includes the operation of stopping the high voltage application to the primary transferring rollers 119 to 122.

Third post-rotation sequence includes the operation of stopping the drive of the scanner units 109 and 110, the photosensitive drums 101 to 104, the intermediate transferring belt 123, the fixing unit 155, and so on, and the operation of stopping the high voltage application to the charge roller.

As described above, for example, the post-rotation sequence is divided into three parts, and executed in combination with the abutting/spacing operation of the developing roller as described in the above-mentioned embodiments. As a result, the deterioration of the lifetime of the developing roller can be further suppressed, and the down time can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-059405, filed Mar. 10, 2008, and No. 2009-041047, filed Feb. 24, 2009, which are hereby incorporated by reference herein in their entirety.

What is claimed is:

1. A controlling method for an image forming apparatus which includes an image bearing member on which a latent image is formed, and a developing unit that is capable of being spaced apart from and brought into contact with the image bearing member and that develops the latent image formed on the image bearing member in a state where the developing unit is brought into contact with the image bearing member, and the method, which includes executing a plurality of post-processing operations after completion of a first image forming operation, comprising:

a step of starting a return process for executing a second image forming operation, when receiving an instruction to start the second image forming operation in a period of time from starting a first post-processing operation of the plurality of post-processing operations, which includes an operation where the developing unit is spaced apart from the image bearing member, to starting a second post-processing operation of the plurality of post-processing operations which is a subsequent post-processing operation of the first post-processing operation, without starting the second post-processing operation; and a step of starting the second post-processing operation when not receiving the instruction to start the second image forming operation in the period of time from the starting of the first post-processing operation to the starting of the second post-processing operation.

2. A controlling method for an image forming apparatus which includes an image bearing member on which a latent image is formed, and a developing unit that develops the latent image formed on the image bearing member, and the method, which includes executing a plurality of post-processing operations after completion of a first image forming operation, comprising:

a step of starting a return process for executing a second image forming operation, when receiving an instruction to start the second image forming operation in a period of time from starting a first post-processing operation of the plurality of post-processing operations, which includes an operation where a supply of a voltage to the developing unit is stopped, to starting a second post-processing operation of the plurality of post-processing operations which is a subsequent post-processing operation of the first post-processing operation, without starting the second post-processing operation; and a step of starting the second post-processing operation when not receiving the instruction to start the second image forming operation in the period of time from the starting of the first post-processing operation to the starting of the second post-processing operation.

3. A controlling method for an image forming apparatus which includes an image bearing member on which a latent image is formed, and a transfer unit that transfers an image developed on the image bearing member to a recording medium, and the method, which includes executing a plurality of post-processing operations after completion of a first image forming operation, comprising:

a step of starting a return process for executing a second image forming operation, when receiving an instruction to start the second image forming operation in a period of time from starting a first post-processing operation of the plurality of post-processing operations, which includes an operation where a supply of a voltage to the transfer unit is stopped, to starting a second post-processing operation of the plurality of post-processing operations which is a subsequent post-processing operation of the first post-processing operation, without starting the second post-processing operation; and a step of starting the second post-processing operation when not receiving the instruction to start the second image forming operation in the period of time from the starting of the first post-processing operation to the starting of the second post-processing operation.

4. An image forming apparatus comprising:

an image bearing member on which a latent image is formed;

a developing unit that is capable of being spaced apart from and brought into contact with the image bearing member, and that develops the latent image formed on the image bearing member in a state where the developing unit is brought into contact with the image bearing member; and a control unit configured to execute a plurality of post-processing operations after completion of a first image forming operation, wherein the control unit is configured to start a return process for executing a second image forming operation, when receiving an instruction to start the second image forming operation in a period of time from starting a first post-processing operation of the plurality of post-processing operations, which includes an operation where the developing unit is spaced apart from the image bearing member, to starting a second post-processing operation of the plurality of post-processing operations which is a subsequent post-processing operation of the first post-processing operation, without starting the second post-processing operation, and wherein the control unit is configured to start the second post-processing operation when not receiving the instruction to start the second image forming operation in the period of time from the starting of the first post-processing operation to the starting of the second post-processing operation.

5. The image forming apparatus according to claim 4, wherein the control unit is further configured to continue a state of the image forming apparatus, when receiving an instruction to notify a delay of the start of the second image forming operation before completion of the first post-processing operation, so as not to start the second post-processing operation during a predetermined period of time after completion of the first post-processing operation, wherein the control unit is further configured to start the return process without starting the second post-processing operation, when receiving the instruction to start the second image forming operation in a period of time from the starting of the first post-processing operation to elapse of the predetermined period of time, and wherein the control unit is further configured to start the second post-processing operation, when not receiving the instruction to start the second image forming operation in the period of time from the starting of the first post-processing operation to the elapse of the predetermined period of time.

6. The image forming apparatus according to claim 4, wherein the control unit is further configured to determine operations of the plurality of post-processing operations to be executed based on a delay time, when receiving information of the delay time, which corresponds to a period of time until reception of the instruction to start the second image forming operation, before completion of the first post-processing operation.

7. The image forming apparatus according to claim 4, wherein the control unit is further configured to start the return process for executing the second image forming operation, when receiving the instruction to start the second image forming operation in a period of time from the starting of the first post-processing operation to discharging a recording medium, which is subjected to the first image forming operation, to outside of the image forming apparatus, without starting the second post-processing operation, and wherein the control unit is further configured to start the second post- processing operation, when not receiving the instruction to start the second image forming operation in a period of time from the starting of the first post-processing operation to discharging the recording medium to outside of the image forming apparatus.

8. The image forming apparatus according to claim 4, wherein a period of time of the return process which is executed after executing the first post-processing operation is shorter than a period of time of the return process which is executed after executing the second post-processing operation.

9. The image forming apparatus according to claim 4, wherein the first post-processing operation includes an operation where a supply of a voltage to the developing unit is stopped.

10. The image forming apparatus according to claim 4, further comprising a transfer unit that transfers an image developed on the image bearing member to a recording medium, wherein the first post-processing operation includes an operation where a supply of a voltage to the transfer unit is stopped.

11. The image forming apparatus according to claim 4, further comprising a charge unit that charges the image bearing member, wherein the first post-processing operation includes an operation where a supply of a voltage to the charge unit is continued.

12. The image forming apparatus according to claim 4, further comprising:

a charge unit that charges the image bearing member;

an exposure unit that forms the latent image on the image bearing member; and a fixing unit that fixes an image transferred to a recording medium, wherein the second post-processing operation includes an operation where a drive of the image bearing member, the exposure unit and the fixing unit is stopped, and an operation where a supply of a voltage to the charge unit is stopped.

13. The image forming apparatus according to claim 4, further comprising:

a charge unit that charges the image bearing member;

an exposure unit that forms the latent image on the image bearing member;

a transfer unit that transfers an image developed on the image bearing member to a recording medium; and a fixing unit that fixes the image transferred to the recording medium, wherein the first post-processing operation includes an operation where a supply of a voltage to the developing unit and the transfer unit is stopped, and wherein the second post-processing operation includes an operation where a drive of the image bearing member, the exposure unit and the fixing unit is stopped, and an operation where a supply of a voltage to the charge unit is stopped.

14. An image forming apparatus comprising:

an image bearing member on which a latent image is formed;

a developing unit that develops the latent image formed on the image bearing member; and a control unit configured to execute a plurality of post-processing operations after completion of a first image forming operation, wherein the control unit is configured to start a return process for executing a second image forming operation, when receiving an instruction to start the second image forming operation in a period of time from starting a first post-processing operation of the plurality of post-processing operations, which includes an operation where a supply of a voltage to the developing unit is stopped, to starting a second post-processing operation of the plurality of post-processing operations which is a subsequent post-processing operation of the first post-processing operation, without starting the second post-processing operation, and wherein the control unit is further configured to start the second post-processing operation when not receiving the instruction to start the second image forming operation in the period of time from the starting of the first post-processing operation to the starting of the second post-processing operation.

15. An image forming apparatus comprising:

an image bearing member on which a latent image is formed;

a transfer unit that transfers an image developed on the image bearing member to a recording medium; and a control unit configured to execute a plurality of post-processing operations after completion of a first image forming operation, wherein the control unit is configured to start a return process for executing a second image forming operation, when receiving an instruction to start the second image forming operation in a period of time from starting a first post-processing operation of the plurality of post-processing operations, which includes an operation where a supply of a voltage to the transfer unit is stopped, to starting a second post-processing operation of the plurality of post-processing operations which is a subsequent post-processing operation of the first post-processing operation, without starting the second post-processing operation, and wherein the control unit is further configured to start the second post-processing operation when not receiving the instruction to start the second image forming operation in the period of time from the starting of the first post-processing operation to the starting of the second post-processing operation.

* * * * *